United States Patent
Liu et al.

(10) Patent No.: US 12,307,844 B2
(45) Date of Patent: May 20, 2025

(54) METHODS AND SYSTEMS FOR CONTROLLING AN INTELLIGENT DEVICE

(71) Applicant: YUNDING NETWORK TECHNOLOGY (BEIJING) CO., LTD., Beijing (CN)

(72) Inventors: Huasheng Liu, Beijing (CN); Lifeng Liu, Beijing (CN); Hao Tang, Beijing (CN); Tao Li, Beijing (CN); Wenfeng Li, Beijing (CN); Pu Liu, Beijing (CN)

(73) Assignee: YUNDING NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 18/668,231

(22) Filed: May 19, 2024

(65) Prior Publication Data

US 2024/0304050 A1 Sep. 12, 2024

Related U.S. Application Data

(60) Division of application No. 17/821,468, filed on Aug. 22, 2022, now Pat. No. 11,989,989, which is a
(Continued)

(30) Foreign Application Priority Data

Jul. 25, 2018 (CN) .......................... 201810824229.5
Jul. 25, 2018 (CN) .......................... 201810824237.X
(Continued)

(51) Int. Cl.
*G07C 9/00* (2020.01)
*G05B 15/02* (2006.01)
*G08B 21/24* (2006.01)

(52) U.S. Cl.
CPC ......... *G07C 9/00896* (2013.01); *G05B 15/02* (2013.01); *G08B 21/24* (2013.01)

(58) Field of Classification Search
None
See application file for complete search history.

(56) References Cited

U.S. PATENT DOCUMENTS 9,329,619 B1  5/2016 Cloutier
11,423,721 B2  8/2022 Liu et al.
(Continued)

FOREIGN PATENT DOCUMENTS

CN  1960278 A  5/2007
CN  101227689 A  7/2008
(Continued)

OTHER PUBLICATIONS

International Search Report in PCT/CN2019/097780 mailed on Oct. 22, 2019, 7 pages.
(Continued)

*Primary Examiner* — K. Wong
(74) *Attorney, Agent, or Firm* — METIS IP LLC

(57) ABSTRACT

The present disclosure relates to a method and system for controlling a smart device. The method includes obtaining correlating information of the smart device. The correlating information includes at least one of smart device information or a communication status of the smart device. The method includes determining indication information of the smart device by processing the correlating information of the smart device according to a preset algorithm. The method includes performing designated operations related to the smart device based at least in part on the indication information.

20 Claims, 22 Drawing Sheets

Related U.S. Application Data continuation-in-part of application No. 17/157,860, filed on Jan. 25, 2021, now Pat. No. 11,423,721, which is a continuation of application No. PCT/CN2019/097780, filed on Jul. 25, 2019.

(30) Foreign Application Priority Data

| Aug. 3, 2018 | (CN) | 201810877034.7 |
| Sep. 5, 2018 | (CN) | 201811030152.0 |

(56) References Cited

U.S. PATENT DOCUMENTS

| 2005/0113080 | A1 | 5/2005 | Nishimura |
| 2006/0026368 | A1 | 2/2006 | Tsuiki |
| 2013/0054844 | A1 | 2/2013 | Kawasumi |
| 2013/0171930 | A1 | 7/2013 | Anand et al. |
| 2016/0190825 | A1 | 6/2016 | Lih et al. |
| 2016/0239024 | A1 | 8/2016 | Fletcher et al. |
| 2017/0013558 | A1 | 1/2017 | Li et al. |
| 2019/0339665 | A1 | 11/2019 | Duan et al. |
| 2021/0247426 | A1 | 8/2021 | Liu et al. |
| 2023/0072967 | A1* | 3/2023 | Lv ............ G07C 9/00817 |

FOREIGN PATENT DOCUMENTS

| CN | 101365205 | A | 2/2009 |
| CN | 101414387 | A | 4/2009 |
| CN | 102298119 | A | 12/2011 |
| CN | 102864984 | A | 1/2013 |
| CN | 103167517 | A | 6/2013 |
| CN | 103364619 | A | 10/2013 |
| CN | 103607302 | A | 2/2014 |
| CN | 103714060 | A | 4/2014 |
| CN | 103973885 | A | 8/2014 |
| CN | 104090240 | A | 10/2014 |
| CN | 104157060 | A | 11/2014 |
| CN | 104375929 | A | 2/2015 |
| CN | 104790766 | A | 7/2015 |
| CN | 104806085 | A | 7/2015 |
| CN | 104851164 | A | 8/2015 |
| CN | 105150874 | A | 12/2015 |
| CN | 105205898 | A | 12/2015 |
| CN | 105239841 | A | 1/2016 |
| CN | 105302751 | A | 2/2016 |
| CN | 105372598 | A | 3/2016 |
| CN | 105388990 | A | 3/2016 |
| CN | 105391124 | A | 3/2016 |
| CN | 105590439 | A | 5/2016 |
| CN | 105735760 | A | 7/2016 |
| CN | 105738831 | A | 7/2016 |
| CN | 105933099 | A | 9/2016 |
| CN | 205743311 | U | 11/2016 |
| CN | 106484071 | A | 3/2017 |
| CN | 106558130 | A | 4/2017 |
| CN | 106971438 | A | 7/2017 |
| CN | 107093243 | A | 8/2017 |
| CN | 107357673 | A | 11/2017 |
| CN | 206921173 | U | 1/2018 |
| CN | 107689097 | A | 2/2018 |
| CN | 107820692 | A | 3/2018 |
| CN | 107889203 | A | 4/2018 |
| CN | 107893583 | A | 4/2018 |
| CN | 207409010 | U | 5/2018 |
| CN | 108154587 | A | 6/2018 |
| CN | 108205836 | A | 6/2018 |
| CN | 108222674 | A | 6/2018 |
| CN | 108226787 | A | 6/2018 |
| CN | 108415803 | A | 8/2018 |
| CN | 108898725 | A | 11/2018 |
| CN | 108958665 | A | 12/2018 |
| CN | 109272728 | A | 1/2019 |
| DE | 102014009826 | A1 | 1/2016 |
| EP | 3410408 | A1 | 12/2018 |

OTHER PUBLICATIONS

Written Opinion in PCT/CN2019/097780 mailed on Oct. 22, 2019, 10 pages.

Deng, Shengxiang, Research and Design on New Intelligent Power Distribution Terminal, Full-text Database of China's Excellent Master's Thesis, Engineering Science and Technology Series II, 2015, 64 pages.

The Extended European Search Report in European Application No. 19840870.0 mailed on Aug. 6, 2021, 8 pages.

* cited by examiner

METHODS AND SYSTEMS FOR CONTROLLING AN INTELLIGENT DEVICE

CROSS REFERENCE TO RELATED APPLICATIONS

This application is a divisional application of U.S. application Ser. No. 17/821,468 filed on Aug. 22, 2022, which is a continuation in part application of U.S. application Ser. No. 17/157,860 (now U.S. Pat. No. 11,423,721), filed on Jan. 25, 2021, which is a continuation of International Patent Application No. PCT/CN2019/097780, filed on Jul. 25, 2019, which claims priority to Chinese Patent Application No. 201810824229.5, filed on Jul. 25, 2018, Chinese Patent Application No. 201810824237.X, filed on Jul. 25, 2018, Chinese Patent Application No. 201810877034.7, filed on Aug. 3, 2018, and Chinese Patent Application No. 201811030152.0, filed on Sep. 5, 2018, the entire contents of which are hereby incorporated by reference.

TECHNICAL FIELD

The present disclosure generally relates to smart devices and control technologies, and more particular, to methods and systems for controlling a smart device based on the Internet.

BACKGROUND

With the improvement of intelligent level of smart devices, the control requirements of the smart devices are becoming increasingly elaborated. It is desirable to solve the problem regarding how to control a smart device reasonably according to different statuses of the smart device in the industry. Accordingly, the present disclosure provides methods and systems for controlling a smart device.

SUMMARY

According to an aspect of the present disclosure, a system may be provided. The system may include at least one storage medium and one or more processors configured to communicate with the at least one storage medium. The at least one storage medium may store a set of instructions. When the one or more processors execute the set of instructions, the one or more processors may be directed to cause the system to perform one or more of the following operations. The system may obtain correlating information of a smart device. The correlating information may include at least one of smart device information or a communication status of the smart device. The system may also determine indication information of the smart device by processing the correlating information of the smart device according to a preset algorithm. The system may further perform designated operations related to the smart device based at least in part on the indication information.

In some embodiments, the communication status of the smart device may include at least a data transfer status of the smart device, and the one or more processors may be directed to cause the system to perform one or more of the following operations. The system may determine whether to generate historical record information based on the data transfer status. In response to the determination that the data transfer status is a failure status, the system may also generate the historical record information based on data to be transferred. The system may further store the historical record information locally.

In some embodiments, to store the historical record information locally, the system may store the historical record information in a storage location corresponding to a write pointer in forms of header information and valid information. The header information may reflect at least one of a data status, a data type, or an effective data length of the historical record information, and the valid information reflects data content of the historical record information.

In some embodiments, the communication status of the smart device may include at least a connection status of the smart device, the system may generate an activation code if the connection status is offline. The activation code may include at least an offline password.

In some embodiments, the activation code may further include restriction condition information of the offline password.

In some embodiments, the one or more processors may be directed to cause the system to perform one or more of the following operations. The system may generate an online password if the connection status is online. The system may further send the online password to a user terminal and a lock controller.

In some embodiments, the smart device may further include a smart lock. The smart device information may include at least information of two components related to the smart lock. The one or more processors may be directed to cause the system to perform one or more of the following operations. The system may determine status information of the smart lock based on the preset algorithm and the information of the two components.

In some embodiments, the one or more processors may be directed to cause the system to perform one or more of the following operations. The system may generate reminder information based on a preset rule and the status information of the smart lock. The system may further send the reminder information to the user terminal.

In some embodiments, the smart device information may include at least electric quantity information of the smart device. The one or more processors may be directed to cause the system to perform one or more of the following operations. The system may determine a first acquisition value of the electric quantity information of the smart device. The system may also determine a second acquisition value of the electric quantity information of the smart device. The system may further generate a processing result by processing the first acquisition value and the second acquisition value according to the preset algorithm. The system may determine an electric quantity reporting time of the smart device based on the processing result.

In some embodiments, the one or more processors may be directed to cause the system to perform one or more of the following operations. The system may perform an electric quantity management operation on the smart device based on the processing result.

According to another aspect of the present disclosure, a method for treatment planning may be provided. The method may include obtaining correlating information of a smart device. The correlating information may include at least one of smart device information or a communication status of the smart device. The method may also include determining indication information of the smart device by processing the correlating information of the smart device according to a preset algorithm. The method may further include performing designated operations related to the smart device based at least in part on the indication information.

According to yet another aspect of the present disclosure, a non-transitory computer readable medium may be provided. The non-transitory computer readable may include at least one set of instructions. When executed by one or more processors of a system, the at least one set of instructions may be directed to cause the system to perform one or more of the following operations. The system may obtain correlating information of a smart device. The correlating information may include at least one of smart device information or a communication status of the smart device. The system may also determine indication information of the smart device by processing the correlating information of the smart device according to a preset algorithm. The system may further perform designated operations related to the smart device based at least in part on the indication information.

According to another aspect of the present disclosure, a method for storing historical record information may be provided. The method may include obtaining a write pointer corresponding to a historical record information region in response to a failure of reporting device operating information to a server. The method may also include storing the device operating information in forms of the historical record information in a storage location corresponding to the write pointer. The method may further include updating the storage location corresponding to the write pointer.

In some embodiments, the method may further include determining whether the operation information is sent to the server successfully. The operation information may include device operation information or valid historical record information. In response to determining that the operation information is sent to the server successfully, a read pointer of the historical record information region may be obtained. The valid historical record information may be read according to the storage location of the read pointer and sent to the server. After the valid historical record information is sent, whether the valid historical record information is sent to the server successfully may be determined. If the valid historical record information fails to be sent, whether the operation information is historical record information already stored in the storage location of the read pointer may be determined. In response to determining that the operation information is historical record information already stored in the storage location of the read pointer, any operation does not be performed. In response to determining that the operation information is not historical record information already stored in the storage location of the read pointer, a write pointer of the historical record information region may be obtained.

In some embodiments, after the write pointer of the historical record information region is obtained, the method may further include determining whether a count of historical record information stored in the historical record information region is greater than a preset maximum storage amount according to the storage location of the write pointer. In response to determining that the count of the historical record information stored in the historical record information region is greater than the preset maximum storage amount, the historical record information in a sector with the earliest storage time in the historical record information region may be erased, and the storage location corresponding to the write pointer may be updated. In response to determining that the count of the historical record information stored in the historical record information region is not greater than the preset maximum storage amount, the historical record information may be stored in a storage location corresponding to the write pointer In some embodiments, after the read pointer of the historical record information region is obtained, the method may further include determining whether a count of historical record information has been sent in the historical record information region is greater than the preset maximum storage amount according to the read pointer of the historical record information region. In response to determining that the count of the historical record information has been sent in the historical record information region is greater than the preset maximum storage amount, the historical record information has been sent in a sector with the earliest storage time in the historical record information region may be erased, and the storage location corresponding to the read pointer may be updated. In response to determining that the count of the historical record information has been sent in the historical record information region is not greater than the preset maximum storage amount, the valid historical record information may be read and sent to the server according to the storage location of the read pointer.

In some embodiments, the obtaining the read pointer of the historical record information region may include obtaining a current read pointer of the historical record information region and determining whether a storage location corresponding to the current read pointer is marked with an abnormal data identifier. In response to determining that the storage location corresponding to the current read pointer is marked with an abnormal data identifier, a read pointer corresponding to a storage location next to the storage location corresponding to the current read pointer in the historical record information region may be determined as the current read pointer. In response to determining that the storage location corresponding to the current read pointer is not marked with an abnormal data identifier, the current read pointer may be determined as the read pointer of the historical record information region.

In some embodiments, the historical record information may include a data status, a data type, an effective data length, a data validity identifier, or valid data.

According to yet another aspect of the present disclosure, a device for storing historical record information may be provided. The device may include a write pointer obtaining unit configured to obtain a write pointer corresponding to a historical record information region in response to a failure of reporting device operating information to a server. The device may also include a historical record information storing unit configured to store the device operating information in forms of historical record information in a storage location corresponding to the write pointer. The device may further include a write pointer updating unit configured to update the storage location corresponding to the write pointer.

In some embodiments, the device may further include a first judging unit. The first judging unit may be configured to determine operation information is sent to the server successfully. The operation information may include device operation information or valid historical record information. In response to determining that the operation information is sent to the server successfully, a read pointer acquisition unit may be triggered. The read pointer acquisition unit may be configured to obtain a read pointer of the historical record information region. An information reporting unit configured to read valid historical record information according to the storage location of the read pointer, send the valid historical record information to the server, and trigger the first judgment unit. In response to determining that the operation information fails to be sent to the server, a second judgment unit may be triggered. The second judgment unit may be configured to determine whether the operation information is historical record information already stored in the storage location of the read pointer. In response to determining that the operation information is historical record information already stored in the storage location of the read pointer, any operation does not be performed. In response to determining that the operation information is not historical record information already stored in the storage location of the read pointer, the write pointer acquisition unit may be triggered.

In some embodiments, the device may further include a third judging unit. The third judging unit may be configured to determine whether a count of historical record information stored in the historical record information region is greater than a preset maximum storage amount according to the storage location of the write pointer. In response to determining that the count of the historical record information stored in the historical record information region is greater than the preset maximum storage amount, a first erasing unit may be triggered and the storage location corresponding to the write pointer may be updated. The first erasing unit may be configured to eras the historical record information in a sector with the earliest storage time in the historical record information region. In response to determining that the count of the historical record information stored in the historical record information region is not greater than the preset maximum storage amount, the historical record information storage unit may be triggered.

In some embodiments, the device may further include a fourth judging unit. The fourth judging unit may be configured to determine whether a count of historical record information has been sent in the historical record information region is greater than the preset maximum storage amount according to the read pointer of the historical record information region.

In some embodiments, the read pointer acquisition unit may include an acquisition sub-unit and a judging sub-unit. The acquisition sub-unit may be configured to obtain a current read pointer in the historical record information region. The judging sub-unit may be configured to determine whether a storage location corresponding to the current read pointer is marked with an abnormal data identifier. In response to determining that the storage location corresponding to the current read pointer is marked with an abnormal data identifier, a second determination sub-unit and the judging sub-unit may be triggered. The second determination sub-unit may be configured to determine a read pointer corresponding to a storage location next to the storage location corresponding to the current read pointer in the historical record information region as the current read pointer. In response to determining that the storage location corresponding to the current read pointer is not marked with an abnormal data identifier, a second determining sub-unit may be triggered. The second determining sub-unit may be configured to determine the current read pointer as the read pointer of the historical record information region.

According to yet another aspect of the present disclosure, a method for controlling a lock may be provided. The method may be applied to a server. The method may include obtaining a connection status of the lock. The method may include generating an activation code if the connection status is offline. The activation code may include an offline password and restriction condition information of the offline password. The method may further include sending the activation code to a user terminal. A lock controller of the lock may obtain the activation code according to an inputting operation of a user and obtain the offline password and the restriction condition information of the offline password by parsing the activation code.

In some embodiments, if the connection status is online, the method may further include generating an online password and restriction condition information of the online password, and sending the online password and the restriction condition information of the online password to the user terminal and the lock controller.

In some embodiments, before the operation for obtaining the connection status of the lock is performed, the method may further include obtaining the password type of a password to be applied input by a preset user. If the password type is a clear code, the method may include generating a clear code and restriction condition information of the clear code and sending the clear code and the restriction condition information of the clear code to the user terminal. If the password type is an unlocking password, the method may include performing the operation for obtaining the connection status of the lock.

According to yet another aspect of the present disclosure, a method for controlling a lock may be provided. The method may be applied to a lock controller. The method may include determining a connection status of the lock. The method may also include obtaining an activation code if the connection status is offline. The activation code may include an offline password and restriction condition information of the offline password. The method may further include obtaining the offline password and the restriction condition information of the offline password in the activation code by parsing the activation code. The method may include storing the offline password and the restriction condition information of the offline password.

In some embodiments, if the connection status is online, the method may further include receiving an online password and restriction condition information of the online password issued by the server and storing the online password and the restriction condition information of the online password.

In some embodiments, the method may further include obtaining a password input by the user, a time point that the user inputs the password, and a total count of historical inputting of the password. If the password is a clear code and the time point meets the restriction condition information of the clear code, the method may include setting all of the valid status of the online password, the valid status of the offline password, and the valid status of the clear code stored in the lock controller to invalid. If the password is an unlocking password, the method may include determining identification information. The unlocking password may include an online password and an offline password. The identification information may indicate whether the time and the count of times that the passwords are allowed to be input by a user meet the restriction condition information of the unlocking password. The method may further include unlocking the lock if the identification information indicates that the time and the count of times that the passwords are allowed to be input by a user meet the restriction condition information of the unlocking password.

According to yet another aspect of the present disclosure, a device for controlling a lock may be provided. The device may be applied to a server. The device may include a status obtaining module configured to obtain a connection status of the lock. The device may include a first generating module configured to generate an activation code if the connection status is offline. The activation code may include an offline password and restriction condition information of the offline password. The device may include a first sending module configured to send the activation code to a user terminal. A lock controller of the lock may obtain the activation code according to an inputting operation of a user and obtain the offline password and the restriction condition information of the offline password by parsing the activation code.

In some embodiments, the device may include a second generating module and a second sending module. The second generating module may be configured to generate an online password and restriction condition information of the online password if the connection status is online. The second sending module may be configured to send the online password and the restriction condition information of the online password to the user terminal and the lock controller.

According to yet another aspect of the present disclosure, a device for controlling a lock may be provided. The device may be applied to a lock controller. The device may include a status determining module configured to determine a connection status of the lock. The device may also include a first obtaining module configured to obtain an activation code if the connection status is offline. The activation code may include an offline password and restriction condition information of the offline password. The device may also include a parsing module configured to obtain the offline password and the restriction condition information of the offline password in the activation code by parsing the activation code. The device may further include a first storing module configured to store the offline password and the restriction condition information of the offline password.

In some embodiments, the device for controlling a lock may further include a receiving module and a second storing module. The receiving module may be configured to receive the online password and the restriction condition information of the online password issued by the server. The second storing module may be configured to store the online password and the restriction condition information of the online password.

According to yet another aspect of the present disclosure, a method for reminding status information of a smart lock may be provided. The method may include obtaining status information of a first component of the smart lock and status information of a second component of the smart lock. The status information of the first component may indicate an opening status or a closing status of a door. The status information of the second component may indicate a locking status of the lock. The method may also include determining status information of the smart lock based on the status information of the first component and the status information of the second component. The method may further include generating reminder information including the status information of the smart lock if the status information of the smart lock meets a preset condition. The method may further include sending the reminder information to a terminal correlated with the smart lock according to a preset rule.

In some embodiments, the first component may be a thimble. The thimble may have a retracted status and an ejected status. The second component may be a latch bolt. The latch bolt may have a retracted status and an ejected status. The operation for determining the status information of the smart lock based on the status information of the first component and the second component may include determining that the door is closed and the lock is locked when the thimble is retracted and the latch bolt is ejected, determining that the door is closed and the lock is unlocked when the thimble is retracted and the latch bolt is retracted, or determining that the door is open when the thimble is ejected.

In some embodiments, the operation for sending the reminder information to a terminal having correlating information with the smart lock according to a preset rule may include sending the reminder information to a terminal having correlating information with the smart lock according to a belonging situation of the house corresponding to the smart lock. The belonging situation may indicate a current using status or a management status of the house.

In some embodiments, the status information of the smart lock may include three kind of status: the door is open, the door is closed but unlocked, and the door is closed and locked. The operation for generating reminder information including the status information of the smart lock if the status information of the smart lock meets a preset condition may include generating first reminder information containing the status information when the status information of the smart lock indicates that the door is open and the duration exceeds a first preset duration, generating second reminder information containing the status information when the status information of the smart lock indicates that the door is closed and unlocked, and the current time reaches a preset time point, or generating third reminder information containing the status information when the status information of the smart lock indicates that the door is closed and locked, and the time between the current time and the last time the smart lock was opened reaches a second preset duration.

In some embodiments, the operation for sending the reminder information to a terminal having correlating information with the smart lock according to the preset rule may include determining the belonging situation of the house corresponding to the smart lock after the first reminder information, the second reminder information, or the third reminder information is generated. If the house corresponding to the smart lock belongs to a user, the first reminder information, the second reminder information, or the third reminder information may be sent to a terminal of the user of the house corresponding to the smart lock.

In some embodiments, the operation for sending the reminder information to a terminal having correlating information with the smart lock according to the preset rule may include determining the belonging situation of the house corresponding to the smart lock after the first reminder information or the second reminder information is generated. If the house corresponding to the smart lock belongs to a manager, the first reminder information or the second reminder information may be sent to a terminal of the manager of the house corresponding to the smart lock.

In some embodiments, the method for reminding status information of a smart lock may include receiving request information for viewing the status information of the smart lock sent by the terminal. The request information may include request identity information. The status information of the smart lock may be returned to the terminal when the requested identity information has a viewing authority.

In some embodiments, the operation for obtaining of the status information of the first component and the second component of the smart lock may include receiving the status information of the first component and the second component uploaded by the smart lock in a preset frequency, or sending an obtaining request for the status information to the smart lock and receiving the status information of the first component and the second component sent by the smart lock according to the obtaining request.

In some embodiments, the operation for obtaining of the status information of the first component and the second component of the smart lock may also include receiving the status information of the first component and the second component which is uploaded by the smart lock when a status of the smart lock changes.

According to yet another aspect of the present disclosure, a device for reminding status information of a smart lock may be provided. The device may include an information obtaining module configured to obtain status information of a first component of the smart lock and status information of a second component of the smart lock. The status information of the first component may indicate an opening status or a closing status of a door. The status information of the second component may indicate a locking status of the lock. The device may also include a status determining module configured to determine status information of the smart lock based on the status information of the first component and the status information of the second component. The device may further include an information generating module configured to generate reminder information including the status information of the smart lock if the status information of the smart lock meets a preset condition. The device may further include an information sending module configured to send the reminder information to a terminal correlated with the smart lock according to a preset rule.

According to yet another aspect of the present disclosure, a method for electric quantity management may be provided. The method may include determining a first acquisition value at a preset reporting time by performing an electric quantity acquisition operation on a battery-powered device according to the determined preset reporting time. The method may also include determining a second acquisition value by performing the electric quantity acquisition operation on the battery-powered device. A generation time of the second acquisition value may be later than the generation time of the first acquisition value. The method may also include generating a comparison result by comparing the first acquisition value and the second acquisition value. The method may further include determining an electric quantity reporting time of the battery-powered device based on the comparison result and performing the electric quantity management operation on the battery-powered device.

In some embodiments, the method may include obtaining a set of electric quantity acquisition values by performing an electric quantity acquisition operation according to a determined electric quantity acquisition time interval. The set of electric quantity acquisition values may include a plurality of electric quantity acquisition values. The method may also include determining a count of electric quantity acquisition values in the set of electric quantity acquisition values according to a first preset reporting time. The method may further include calculating an average value of the plurality of electric quantity acquisition values. The average value may be determined as the first electric quantity acquisition value. The method may further include determining the first electric quantity acquisition value and a first time point corresponding to the first preset reporting time as the first acquisition value.

In some embodiments, if the preset reporting time is the first preset reporting time, the method may include determining a time point corresponding to the first preset reporting time as a time point performing the first time of electric quantity acquisition operation, and acquiring a preset count of electric quantity acquisition values at a preset time interval, calculating an average of the electric quantity acquisition values, and determining the average as a second electric quantity acquisition value, obtaining a second time point when the electric quantity was latest acquired, and determining the second electric quantity acquisition value and the second time point as the second acquisition value.

In some embodiments, the method may include calculating an electric quantity difference between the first electric quantity acquisition value and the second electric quantity acquisition value and a time difference between the second time point and the first time point.

In some embodiments, the method may include determining whether the electric quantity difference is greater than a preset abnormal electric quantity change threshold. In response to determining that the electric quantity difference is greater than the preset abnormal electric quantity change threshold, the method may include determining whether the time difference is less than a preset abnormal detection time threshold. In response to determining that the electric quantity difference is greater than a preset abnormal electric quantity change threshold and that the time difference is less than a preset abnormal detection time threshold, the method may include calculating an electric quantity value to be reported according to the first acquisition value and the second acquisition value, sending the electric quantity value to be reported to the server, and determining whether the smart lock is in high-power consumption status based on the electric quantity value to be reported. The method may include performing an electric quantity management operation if the smart lock is in the high-power consumption status.

In some embodiments, the method may include acquiring electric quantity values within a second preset reporting time range at a preset electric quantity acquisition time interval. The method may also include calculating an average value of the electric quantity values within the second preset reporting time range. The method may further include determining the average value as the second electric quantity acquisition value. The second acquisition value may include the second electric quantity acquisition value and a second time point corresponding to the second preset reporting time.

In some embodiments, the method may include determining whether the comparison result meets a predetermined condition of a preset normal electric quantity status. In response to determining that the comparison result meets the predetermined condition, a first processing operation of the second acquisition value may be performed. The first processing operation may indicate that the second acquisition value is not reported to the server. In response to determining that the comparison result does not meet the predetermined condition, the second acquisition value may be reported to the server, and a second processing operation of the battery-powered device may be performed. The second processing operation may indicate an electric quantity management performed on the battery-powered device which is in a low electric quantity status.

In some embodiments, the method may include turning off a predetermined power consumption module of the battery-powered device.

In some embodiments, the method may include determining whether there is a terminal device connected to the battery-powered device by performing a Bluetooth broadcast detection. In response to determining that there is a terminal device connected to the battery-powered device, the electric quantity value of the battery-powered device may be sent to the terminal device at the reporting time.

According to yet another aspect of the present disclosure, a device for electric quantity management may be provided. The device may include a first acquisition unit configured to determine a first acquisition value at a preset reporting time by performing an electric quantity acquisition operation on a battery-powered device according to the determined preset reporting time. The device may include a second acquisition unit configured to determine a second acquisition value by performing the electric quantity acquisition operation on the battery-powered device. A generation time of the second acquisition value may be later than the generation time of the first acquisition value. The device may include a comparing unit configured to generate a comparison result by comparing the first acquisition value and the second acquisition value. The device may further include a determining unit configured to determine an electric quantity reporting time of the battery-powered device based on the comparison result and perform an electric quantity management operation on the battery-powered device.

BRIEF DESCRIPTION OF THE DRAWINGS

The present disclosure is further illustrated in terms of exemplary embodiments. These exemplary embodiments are described in detail with reference to the drawings. These embodiments are non-limiting schematic embodiments, in which like reference numerals represent similar structures throughout the several views of the drawings, and wherein.

DETAILED DESCRIPTION

Figure 1:
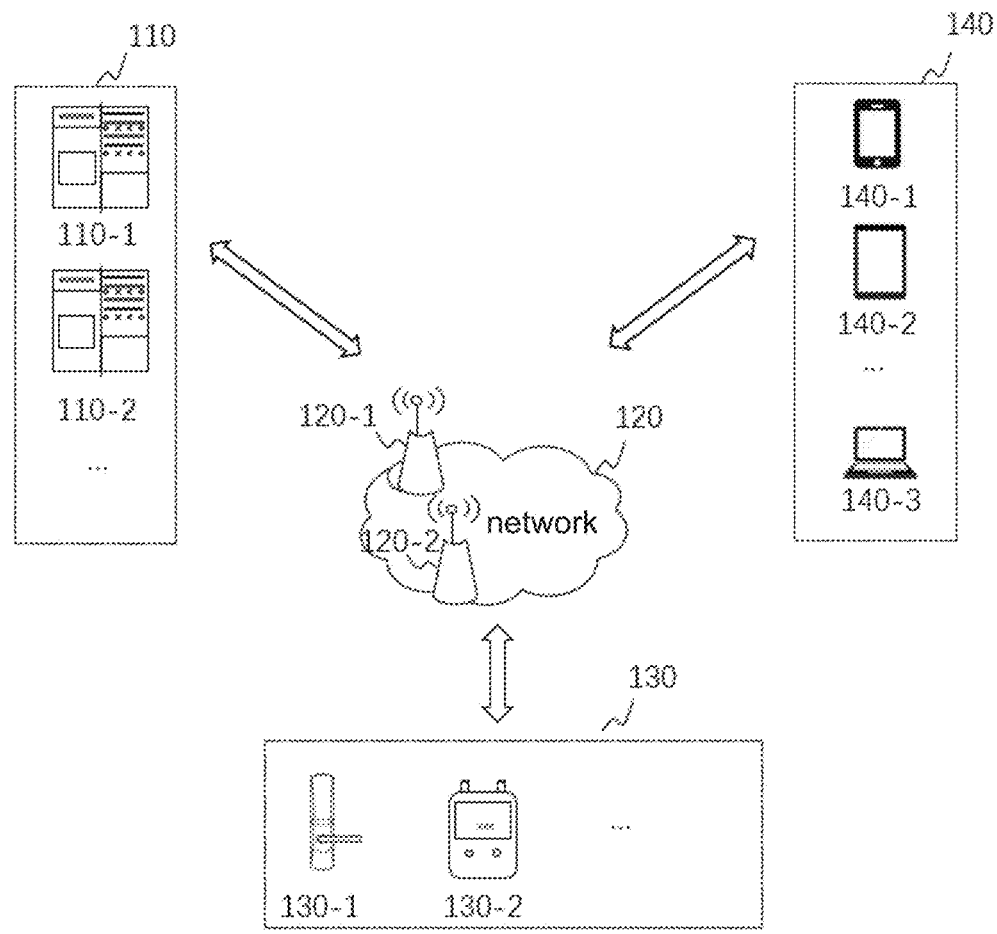
FIG. 1 is a schematic diagram illustrating an application scenario of a smart device controlling method and a smart device controlling system according to some embodiments of the present disclosure.

In order to describe the technical solutions of the embodiments of the present disclosure more clearly, the following description will briefly introduce the drawings used in the description of the embodiments. Obviously, the drawings in the following description are only some examples or embodiments of the present disclosure. For person of ordinary skilled in the art, without creative work, the present disclosure may be applied to other similar scenarios according to these drawings. Unless obviously obtained from the context or expressively status, the same numeral in the drawings refers to the same structure or operation.

It will be understood that the term "system," "unit," "module," and/or "block" used herein are one method to distinguish different components, elements, parts, section, or assembly of different level in ascending order. However, the terms may be displaced by another expression if they achieve the same purpose.

As used in the disclosure and the appended claims, the singular forms "a," "an," and "the" include plural referents unless the content clearly dictates otherwise. It will be understood that the terms "comprise", "comprises", and/or "comprising", "include", "includes", and/or "including", when used in this specification, specify the presence of status features, integers, steps, operations, elements, and/or components, but do not preclude the presence or addition of one or more other features, integers, steps, operations, elements, components, and/or groups thereof. The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

FIG. 1 is a schematic diagram illustrating an application scenario of a smart device controlling method and a smart device controlling system according to some embodiments of the present disclosure.

The smart device controlling system 100 may control and manage smart devices in various manufacturing and living regions (e.g., residential houses, office buildings, factories, schools, hospitals, hotels, rental houses, etc.). The smart devices may include a smart lock (e.g., a smart door lock), a smart electricity meter, a smart water meter, a smart gas meter, etc. For example, the smart device controlling system 100 may obtain electric quantity information of a smart lock or a smart meter, and control the electric quantity usage of the smart lock or the smart meter according to the electric quantity information. As another example, the smart device controlling system 100 may obtain switch status information of a smart lock, and determine safety information of a house according to the switch status information of the smart lock. As still another example, the smart device controlling system 100 may also obtain online/offline status information of a smart lock and/or other smart devices, and perform a password management on the smart lock and/or other smart devices according to the online/offline status information. As still another example, the smart device controlling system 100 may report the electric quantity information of the smart device, the switch status information of the smart lock, and the smart password management information to a corresponding server, so that the server may perform related operations based on the reported information. When data transmission communication between the smart device and the server is disconnected, the system may store data to be reported to the server locally at the smart device. When the data transmission communication between the smart device and the server works normally, the system may re-report the locally stored data to the server.

In order to achieve the above-mentioned functions, the smart device controlling system in at least one embodiment of the present disclosure may obtain the correlating information of the smart device, such as information of the smart device and/or communication status of the smart device, and process the correlating information of the smart device based on a preset algorithm to determine indication information of the smart device. The system may perform designated operations related to the smart device at least based on the indication information.

In some embodiments, the smart device controlling system 100 may obtain electric quantity information of the smart device. A corresponding processor may determine indication information related to power consumption status by processing the obtained electric quantity information status. The processor may control a power consumption module of the smart device to turn on or off, or provide a judgment instruction regarding whether to report a current electric quantity of the smart device to the server based on the indication information.

In some embodiments, the smart device controlling system 100 may obtain location information of one or more components in a smart device (e.g., a smart lock). A corresponding processor may determine use status of the smart device by processing the location information. The processor may determine whether a safety reminder is needed, that is, whether to send an information to a user terminal according to the use status of the smart device.

In some embodiments, the smart device controlling system 100 may obtain an online/offline status of the smart device (e.g., a smart lock). A processor may determine indication information based on the online/offline status, that is, generate an online password/activation code corresponding to the online/offline status, respectively. The processor may perform designated operations related to the smart device based on the determined indication information, that is, determine whether to send the online password or the activation code to a user terminal based on the generated indication information.

In some embodiments, the smart device controlling system 100 may obtain a data transfer status between the smart device and the server, that is, whether the smart device reports information to the server successfully. When the smart device fails to report information to the server 110, the processor may determine the indication information of the smart device based on the failure status, that is, determine the data information that is not successfully reported as historical record information, and perform locally storage operation on the smart device according to the determined historical record information.

As shown in FIG. 1, the smart device controlling system 100 includes a server 110 (processor), a smart device 130, a client terminal 140 (user terminal), and a network 120.

The server (processor) 110 may obtain correlating information of the smart device 130, and process the correlating information of the smart device based on a preset algorithm, and determine the indication information of the smart device for performing one or more functions described in the present disclosure. The correlating information may include smart device information and/or communication status of the smart device. The smart device information may be understood as device information of the smart device. The smart device information may include component information, electric quantity information, operation information, etc., of the smart device. For example, the device information of the smart device may be remaining electric quantity information of the smart device. As another example, the device information of the smart device may be location information of one or more components of the smart device. The communication status of the smart device may be a related status regarding data transmission between the smart device 130 and the server 110 through the network 120. Specifically, the communication status of the smart device may include a report status, a download status, an online/offline status, or the like, or any combination thereof. For example, the communication status of the smart device may include whether the smart device reports data successfully. As another example, the communication status of the smart device may include whether the smart device is online. In some embodiments, the indication information may indicate a current status of the smart device, and/or information instructing any module in the smart device controlling system 100 to perform one or more operations. For example, the indication information may include information indicating abnormal power consumption of the smart device and information instructing the server 110 to send information to the user terminal 140.

The server 110 may perform a part of functions of the smart device controlling system 100. Specifically, in some embodiments, the server 110 may determine whether the power consumption of the smart device is abnormal by obtaining the electric quantity information of the smart device. For example, if the power consumption of the smart device is too high, the server 110 may control the smart device to turn off some functional modules with high-power consumption. In some embodiments, the server 110 may determine that a smart lock is in an open status, a closed status, or a locked status by acquiring the position information of one or more components of the smart lock. If the smart lock is in the open status for a long time, the server 110 may send a safety reminder to the user terminal. In some embodiments, when the server 110 determines that the smart device is online, the server may generate an online password and online password usage conditions, and send them to the smart device and the user terminal through the network. The user may use the online password to unlock the smart device. When the server 110 determines that the smart device is offline, the server may generate an activation code and send the activation code to the user terminal through the network. The user may operate the smart device through the activation code to obtain an offline password of the smart device. The user may use the offline password to unlock the smart device.

In some embodiments, the server 110 may be a single server or a server group. The server group may be centralized or distributed (e.g., the server 110 may be a distributed system). In some embodiments, the server 110 may be local or remote. For example, the server 110 may access the smart device 130 and the client terminal 140 through the network 120. As another example, the server 110 may be directly connected to the smart device 130 and the client terminal 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device. In some embodiments, the server 110 may be implemented on a mobile device.

The network 120 may be used for the exchange of information and/or data. One or more components (e.g., the server 110, the smart device 130, the client terminal 140, etc.) of the system may send information/data to other components through the network 120. For example, the smart device 130 may report data or information such as electric quantity information, component information, etc., of the smart device to the server 110 via the network 120. As another example, the server 110 may send data or information such as a password, an activation code, etc., to the client terminal 140 via the network 120. In some embodiments, the network 120 may be any type of wired or wireless network, or a combination thereof. For example, the network 120 may include a cable network, a wired network, a fiber-optic network, a telecommunication network, an intranet, the Internet, a local region network (LAN), a wide region network (WAN), a wireless local region network (WLAN), a metropolitan region network (MAN), a public telephone switched network (PSTN), a general package radio service (GPRS), a mobile phone network, a narrow band internet of things (NB-IoT/LoRa), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the smart device controlling system 100 may be connected to the network 120 to exchange data and/or information.

The smart device 130 may include some smart home devices installed in the house. In some embodiments, the smart device 130 may include, but is not limited to, a smart lock, a smart meter, a smart water meter, a smart gas meter, an electrical switch, a television, an air conditioner, or other electrical equipment. The smart device 130 may receive instructions from the server 110 and/or the client terminal 140 and execute the instructions. For example, a smart lock may receive an instruction from the server 110, and be closed or opened based on the instruction. As another example, a smart lock may receive an instruction from the server 110, and control a power source switch of a function module to be turned on or off based on the instruction. In some embodiments, the smart device 130 may also transmit its own working status information to the server 110. For example, the smart lock may transmit status information that a smart lock has been opened or closed to the server 110. As another example, the smart lock may transmit its own electric quantity information to the server 110.

In some embodiments, the smart device 130 may also include a storage device for storing data locally. Specifically, when the smart device fails to report data to the server, the smart device may store the data to be reported to the server locally. When data transmission and communication between the smart device and the server are normal, the locally stored data may be re-reported to server.

The client terminal (user terminal) 140 may include user terminals of all relevant users of the house where the smart device 130 is installed. Specifically, the related users may include house managers, for example, merchants who rented the house. The related users may include house users, for example, tenants in the house. The related users may include house owners. The related users may also include house cleaning staffs. The client terminal may include, but is not limited to, a user terminal of any person in the above-mentioned role. For example, the client terminal 140 may be a user terminal of a hotel manager, a user terminal of a hotel occupant, a user terminal of a landlord of a rental house, or a user terminal of a tenant of a rental house. The client terminal 140 may receive information or data sent by the server 110 and the smart device 130 via the network 120. For example, the client terminal 140 may receive the activation code information sent by the server 110. As another example, the client terminal 140 may receive unlocked information of the smart lock sent by the smart device 130. In some embodiments, different client terminals may receive different information. For example, the server 110 may send the information only to a user terminal of a landlord of a rental house according to a predetermined rule, only to a user terminal of a tenant of a rental house, or simultaneously to all user terminals associated with the smart device. The client terminal 140 may be used to display information, such as data recorded by the smart device controlling system 100, a working status of the smart device 130, unlocking records, etc. The client terminal 140 may also be used to operate the smart device 130 directly or through a server, and receive an operation result fed back by the server 110 or the smart device 130 of the smart device controlling system 100. For example, a user may remotely unlock a smart lock through the client terminal, and display the unlocking result on the client terminal. In some embodiments, the client terminal 140 may include, but is not limited to, a desktop computer, a laptop computer, a smart phone, a personal digital assistance (PDA), a tablet computer, a handheld game console, smart glasses, a smart watch, a wearable device, a virtual display device, a handheld game player, or the like, or any combination thereof.

In some embodiments, the server 110, the smart device 130, and the client terminal 140 may be provided with storage devices separately. An independent storage device may also be provided in the smart device controlling system 100 for storing data and/or instructions. In some embodiments, the storage device may include a mass storage device, a removable storage device, a volatile read-and-write memory, a read-only memory (ROM), or the like, or any combination thereof. Exemplary mass storage may include a magnetic disk, an optical disk, a solid-status drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

Some embodiments of the present disclosure provide an electric quantity management method and device. As a control device in the smart device, the electric quantity management device may realize functions of determining electric quantity status information of the smart device and managing electric quantity usage. In some embodiments, the electric quantity management device may include at least one processor. The at least one processor may be configured to direct the system to determine a first acquisition value of the electric quantity information of the smart device; determine a second acquisition value of the electric quantity information of the smart device; generate a processing result by processing the first acquisition value and the second acquisition value according to a preset algorithm; and determine, based on the processing result, an electric quantity reporting time of the smart device. The electric quantity management device may further include a first acquisition unit, a second acquisition unit, a comparison unit, and a determination unit. In some embodiments, the electric quantity management device may further include a module power source control unit.

In some embodiments, the electric quantity management device may communicate with the server 110 via the network 120 and report determined electric quantity information to the server 110. The server 110 may also send a control instruction to the electric quantity management device through the network 120 to realize management and control of the electric quantity management device. In some embodiments, the electric quantity management device may also communicate with the user terminal 140 via the network 120, and display relevant information in the user terminal. For example, the user terminal 140 may display the remaining electric quantity of the smart device 130 in real time.

Figure 2:
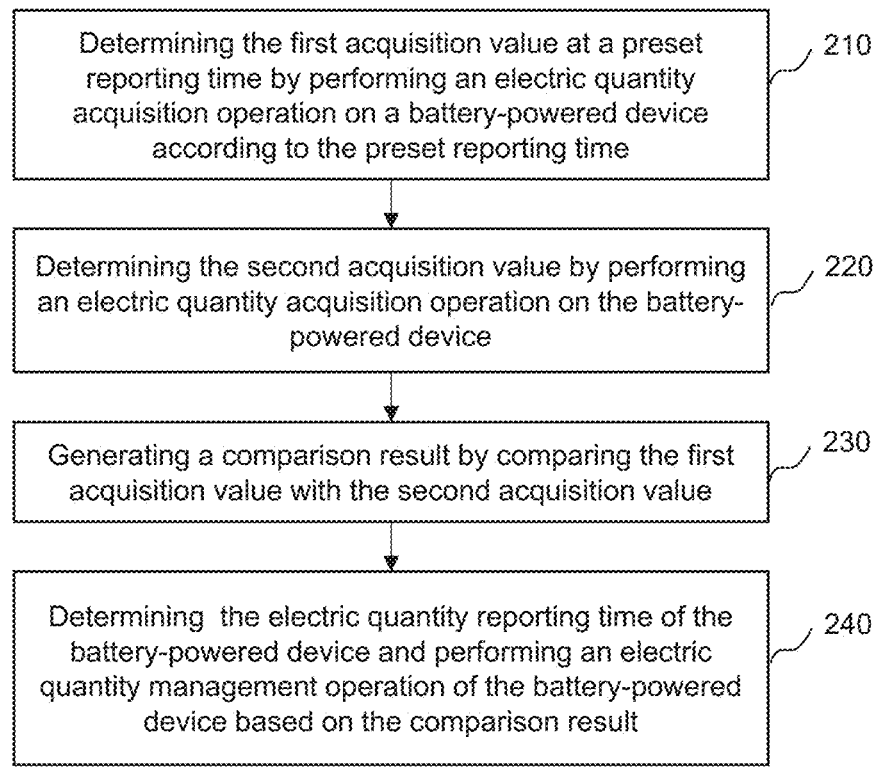
FIG. 2 is a flowchart illustrating an electric quantity management method according to some embodiments of the present disclosure.

FIG. 2 is a flowchart illustrating an electric quantity management method according to some embodiments of the present disclosure.

In 210, the first acquisition value may be determined at a preset reporting time by performing an electric quantity acquisition operation on a battery-powered device according to the preset reporting time. Operation 210 may be implemented by the first acquisition unit.

In the present disclosure, a battery-powered device mainly refers to a smart device powered by batteries, such as a smart electronic photo frame, a smart router, a smart lock, or other devices.

In some embodiments, the electric quantity management method may be executed by a battery-powered device. Generally, the battery-powered device may need to perform an electric quantity reporting operation after being powered on, after an abnormal restart, or when it is coupled to a new device. The battery-powered device may also need to report the electric quantity value to the server at the electric quantity reporting time. In some embodiments, the electric quantity value of the battery-powered device may be acquired at a certain time interval. However, the electric quantity value may be not reported to the server after each acquisition. A preset reporting time may be set, and report electric quantity to the server at the preset reporting time.

For example, taking a smart lock as an example, the preset reporting time may set every 4 hours according to a random initial time point of 0:00~ 3:59. The preset reporting time may be set based on a media access control (MAC) address of a Bluetooth chip of the smart lock according to a determined algorithm.

The first acquisition value may include a first electric quantity acquisition value, a first time point corresponding to the preset reporting time or generation time of the first acquisition value.

In 220, the second acquisition value may be determined by performing an electric quantity acquisition operation on the battery-powered device. Operation 220 may be implemented by the second acquisition unit. The second acquisition value may include a second electric quantity acquisition value and a second time point corresponding to generation time of the second acquisition value.

The generation time of the second acquisition value may be later than the generation time of the first acquisition value.

The generation time of the second acquisition value may be later than the generation time of the first acquisition value. The generation time may be understood as the preset reporting time or the latest electric quantity acquisition time in an acquisition period. Specifically, if an acquisition period is 4 hours, the start time is 1:00, and the end time is 5:00, 5:00 may be the generation time of the acquisition value. Assuming that the generation time of the first acquisition value is 5:00, the generation time of the second acquisition value may be later than 5:00. The time interval between the generation time of the first acquisition value and the generation time of the second acquisition value may be set based on battery performance of the battery-powered device or performance of the server to which the electric quantity data is reported.

In 230, a comparison result may be generated by comparing the first acquisition value with the second acquisition value. Operation 230 may be performed by a comparison unit.

It is understood that after the first acquisition value is obtained, it will not be reported to the server immediately, but needs to be compared with the second acquisition value. A difference between the first electric quantity acquisition value and the second electric quantity acquisition value and a difference between the second time point and the first time point may be determined by comparing the first acquisition value and the second acquisition value.

In 240, the electric quantity reporting time of the battery-powered device may be determined and an electric quantity management operation of the battery-powered device may be performed based on the comparison result. Operation 240 may be performed by a determining unit.

The electric quantity reporting time of the battery-powered device may be determined based on the above comparison result, that is, a current electric quantity status of the battery-powered device may be determined based on the comparison result, that is, whether the battery-powered device is in a normal power consumption status, or in a high-power consumption status or abnormal power consumption status. Based on the determination result, whether the electric quantity value of the battery-powered device needs to be reported may be determined. The reporting time may be the generation time of the determination result. It is assumed that in order to better reduce data load of the server, it is possible to report only the electric quantity acquisition values with abnormal electric quantity problems, or report the acquisition values after a certain count of acquisitions.

The electric quantity management operation of the battery-powered device may be performed based on the comparison result, that is, the electric quantity status of the battery-powered device may be obtained through real-time judgment, and a timely response may be made. For example, if the battery-powered device is determined to be in a high-power consumption status, some power-consuming modules may be turned off. If the battery-powered device is determined to be in an abnormal status, the battery-powered device may be turned off. In some embodiments, the server may also remind the user to perform operations related to charging according to the electric quantity status of the battery-powered device. In some embodiments, operations related to charging may include, but are not limited to, changing batteries, charging, or automatically associating wireless charging devices. In some embodiments, after the server determine that the electric quantity the battery-powered device is less than a preset electric quantity (e.g., 5%, 10%, or 15%, etc.), the server may detect whether there is a charging device within a certain distance range (e.g., 100 meters, 50 meters, 10 meters or 1 meter, etc.). In some embodiments, when the server detects that there is a charging device within a certain distance range, the server may send a signal output instruction to the charging device. The signal output instruction may be used to instruct the charging device to output a target signal for conversion into a current signal. In some embodiments, the smart device 130 may obtain the target signal output by the charging device, convert the target signal into a current signal, and transmit the converted current signal to the battery. In some embodiments, when the server detects that there is no charging device within a certain distance, the server may output reminder information to remind the user to move the charging device within a certain distance.

The electric quantity management method of the smart lock provided by the present disclosure may direct to obtain the corresponding electric quantity acquisition values of the battery-powered device at a preset reporting time and another time point later than the preset reporting time, compare the acquisition values corresponding to the two acquisition times, and determine the electric quantity reporting time based on the comparison result and perform the corresponding electric quantity management operation. In an aspect, the electric quantity value may be reported at determined electric quantity reporting time may reduce load of the server caused by frequent reporting electric quantity values to the server. the electric quantity reporting time may be determined according to the comparison result, which may improve the accuracy of the acquisition data. In another aspect, the electric quantity management operation of the battery-powered device may be performed based on the detected electric quantity value so as to avoid the inconvenience caused by low electric quantity and improve user experiences.

Figure 3:
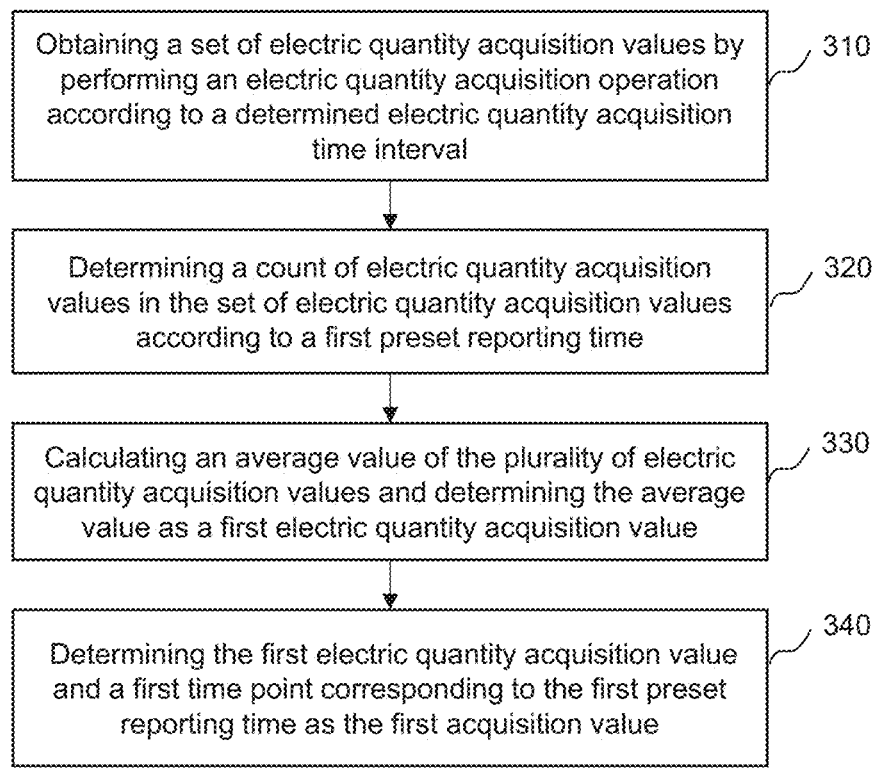
FIG. 3 is a schematic diagram illustrating a method for determining the first acquisition value according to some embodiments of the present disclosure.

In some embodiments, a method for determining the first acquisition value may be illustrated in FIG. 3.

In 310, a set of electric quantity acquisition values may be obtained by performing an electric quantity acquisition operation according to a determined electric quantity acquisition time interval. The set of electric quantity acquisition values may include a plurality of electric quantity acquisition values.

In 320, a count of electric quantity acquisition values in the set of electric quantity acquisition values may be determined according to a first preset reporting time.

In 330, an average value of the plurality of electric quantity acquisition values may be calculated, and the average value may be determined as a first electric quantity acquisition value.

In 340, the first electric quantity acquisition value and a first time point corresponding to the first preset reporting time may be determined as the first acquisition value.

If the battery-powered device is a smart lock, electric quantity values of the smart lock may be acquired at a preset time interval, and the acquisition value may be an average value of the acquired electric quantity values. For example, the electric quantity may be acquired at an interval of 20 minutes. Finally, the reported electric quantity value (i.e., the first acquisition value) may be an average value of the electric quantity values acquisition in the latest 15 times at the preset reporting time. 15 may be a predetermined count of electric quantity acquisition times. If the count of electric quantity acquisition is less than 15, the average value of the electric quantity values may be calculated according to an actual count of electric quantity acquisition times. If the electric quantity value is reported, the reported electric quantity value may be stored, and buffered electric quantity value data, that is, previously acquired electric quantity values and the count of electric quantity acquisition times may be cleared.

If the above electric quantity acquisition operation is a first time of electric quantity acquisition operation, that is, the preset reporting time is the first preset reporting time, an embodiment of the present disclosure may provide a method for determining a second acquisition value. The method may include determining a time point corresponding to the first preset reporting time as a time point performing the first time of electric quantity acquisition operation, and acquiring a preset count of electric quantity acquisition values at a preset time interval, calculating an average of the electric quantity acquisition values, and determining the average as a second electric quantity acquisition value, obtaining a second time point when the electric quantity was latest acquired, and determining the second electric quantity acquisition value and the second time point as the second acquisition value.

Based on the above example, after the first acquisition value is obtained, electric quantity values may be re-acquisition at a preset time interval (e.g., 20 minutes). When the electric quantity acquisition process is complete for 3 times, an average of electric quantity values and time points of the three electric quantity acquisitions may be determined.

In some embodiments, a method for comparing a first acquisition value and a second acquisition value may be provided. The method may include calculating an electric quantity difference between the first electric quantity acquisition value and the second electric quantity acquisition value and a time difference between the second time point and the first time point.

For example, the average electric quantity value of the first acquisition value, that is, a first electric quantity acquisition value P1 and a corresponding time point T1 may be used as the first acquisition value. The electric quantity value may be re-acquisition at an interval of 20 minutes. Each time after 3 times of electric quantity acquisitions are complete, an average electric quantity value P2 of the three electric quantity acquisitions and a corresponding time point T2 may be determined; |P2-P1| may be determined as the electric quantity difference, and T2-T1 may be determined as the time difference. Based on the above comparison values, whether the electric quantity difference is greater than a preset abnormal electric quantity change threshold may be determined. In response to determining that the electric quantity difference is greater than the preset abnormal electric quantity change threshold, whether the time difference is less than a preset abnormal detection time threshold may be determined. In response to determining that the electric quantity difference is greater than a preset abnormal electric quantity change threshold and that the time difference is less than a preset abnormal detection time threshold, an electric quantity value to be reported may be calculated according to the first acquisition value and the second acquisition value.

The electric quantity value to be reported may be sent to the server. Whether the smart lock is in high-power consumption status may be determined based on the electric quantity value to be reported. An electric quantity management operation may be performed if the smart lock is in the high-power consumption status.

For example, if |P2-P1| is larger than the preset abnormal electric quantity change threshold and T2-T1 is less than the preset abnormal detection time threshold, the smart lock may be in high-power consumption status, the electric quantity value needs to be reported, a current average electric quantity value P1 may be updated, and current acquisition data may be cleared. At this time, the electric quantity value needs to be reported, that is, the electric quantity reporting time may be determined based on the judgment result.

If it is determined that the smart lock is in high-power consumption according to the comparison result, a high-power consumption electric quantity management strategy may be implemented. The high-power consumption electric quantity management strategy may be set mainly according to specific performance of the corresponding battery-powered device. For example, in order to reduce power consumption, an information transmission module or an auxiliary function module of the device may be turned off. The power consumption of the device may be reduced thus ensuring its normal operation.

In some embodiments, when electric quantity acquisition values have been reported to the server, a solution may be provided.

When the smart lock has sent electric quantity acquisition values to the server, the determining second acquisition value by performing an electric quantity acquisition operation on the smart lock may include one or more operations.

Electric quantity values within a second preset reporting time range may be acquired at a preset electric quantity acquisition time interval.

An average value of the electric quantity values within the second preset reporting time range may be calculated. The average value may be determined as the second electric quantity acquisition value. The second acquisition value may include the second electric quantity acquisition value and a second time point corresponding to the second preset reporting time.

Further, the performing electric quantity management operation of the battery-powered device based on the comparison result includes one or more operations.

The one or more operations may include determining whether the comparison result meets a predetermined condition of a preset normal electric quantity status. In response to determining that the comparison result meets the predetermined condition, a first processing operation of the second acquisition value may be performed. The first processing operation may indicate that the second acquisition value is not reported to the server.

In response to determining that the comparison result does not meet the predetermined condition, the second acquisition value may be reported to the server, and a second processing operation of the battery-powered device may be performed. The second processing operation may indicate an electric quantity management performed on the battery-powered device which is in a low electric quantity status.

For example, if the latest reported electric quantity value is P1 and the corresponding reporting time point is T1. When it is time to report the electric quantity value (normally, the electric quantity acquisition process is complete for 12 times after 4 hours), the average electric quantity P2 acquisition in the past and a corresponding time point T2 may be calculated.

If |P2-P1| is less than a normal power consumption change range and T2-T1 is less than a time threshold, that is, if the electric quantity change is less than a certain value within a certain time range and the device is in a normal electric quantity status, that the power consumption is normal may be determined and the electric quantity value is not reported. At this time, the previously reported electric quantity value may be still P1 and the corresponding reporting time point may be still T1.

If |P2-P1| is larger than or equal to the normal power consumption variation range or T2-T1 is larger than or equal to the time threshold, that is, if the electric quantity change is large, the device is in a low-electric quantity status, or it has been more than a certain time since the latest electric quantity value reporting so far, the electric quantity value needs to be reported. P1 may be updated to a current reported electric quantity value and the corresponding reporting time point T1 may be updated.

Figure 4:
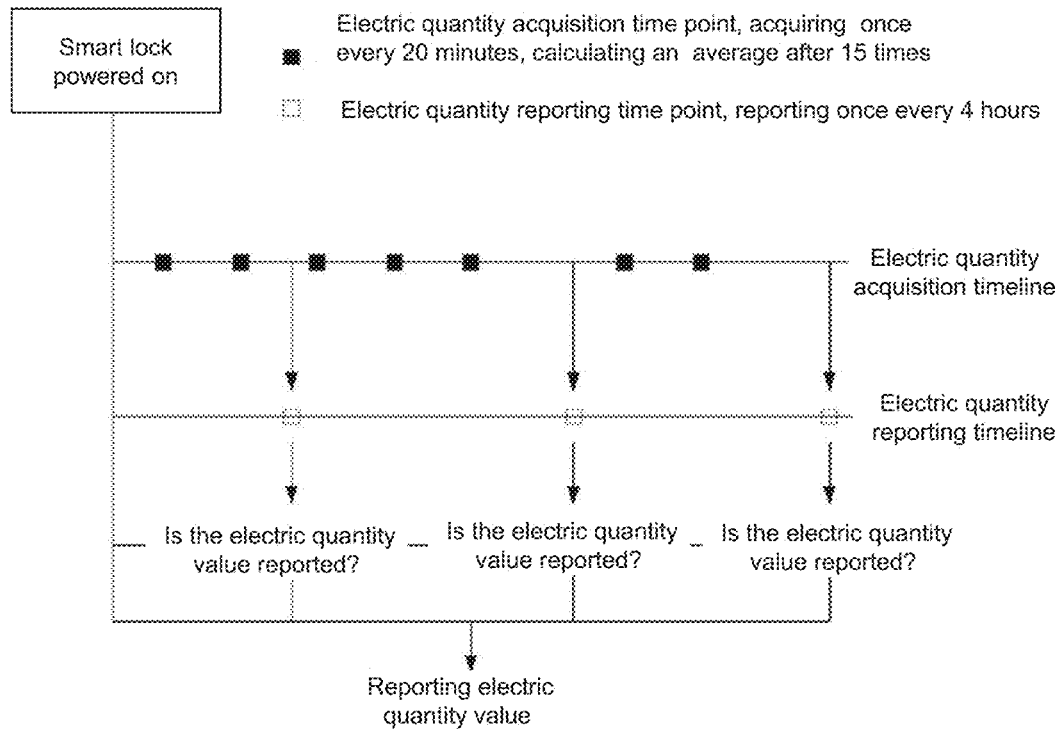
FIG. 4 is a schematic diagram illustrating exemplary electric quantity timelines of a smart lock according to some embodiments of the present disclosure.

The smart lock may be provided as an example in FIG. 4. FIG. 4 is a schematic diagram illustrating exemplary electric quantity timelines of a smart lock according to some embodiments of the present disclosure. As shown in FIG. 4, an electric quantity acquisition timeline and an electric quantity reporting timeline are independent of each other. The electric quantity acquisition of the smart lock and the calculation of an average value of the acquired electric quantity values may not be interfered by electric quantity reporting time points. A starting time of the electric quantity acquisition may be the time when the lock is powered on. Time points for determining the electric quantity value reporting of the lock may be generated randomly, and the time points may be generated randomly within 4 hours. At a determined electric quantity reporting time point, whether the electric quantity value needs to be reported according to a current electric quantity status of the smart lock may be determined. In this case a failure to report the electric quantity value in time, which is caused by a heavy load of the server due to frequent reporting, may be avoided.

The above strategy for generating the electric quantity reporting time in a time period randomly and the optimization of the count of electric quantity reporting may ensure that the electric quantity reporting time of the lock is random, thereby avoiding the load on the server caused by the massive reported electric quantity data of the smart lock. At the same time, electric quantity values may be reported in time when the lock electric quantity changes abnormally, which may solve the problem that the electric quantity values are not reported in time when the lock electric quantity changes abnormally.

Correspondingly, in some embodiments, a method for incorporating electric quantity information in Bluetooth broadcast data may be provided.

The method may include determining whether there is a terminal device connected to the battery-powered device by performing a Bluetooth broadcast detection. In response to determining that there is a terminal device connected to the battery-powered device, the electric quantity value of the battery-powered device may be sent to the terminal device at the reporting time.

For smart locks that have no networking function or battery-powered devices whose networking functions are damaged, a mobile phone application of the battery-powered device may be configured so as to synchronize electric quantity information or data.

For example, if a master control of a smart lock uses a Bluetooth chip, during the Bluetooth broadcast, the electric quantity value of the smart lock reported each time may be updated in the Bluetooth broadcast. If the mobile phone is close to the smart lock, the mobile phone application of the smart lock may search for surrounding smart lock devices, and synchronize the electric quantity value broadcasted by the smart lock and update the current electric quantity value of the lock to the server at the same time.

Figure 5:
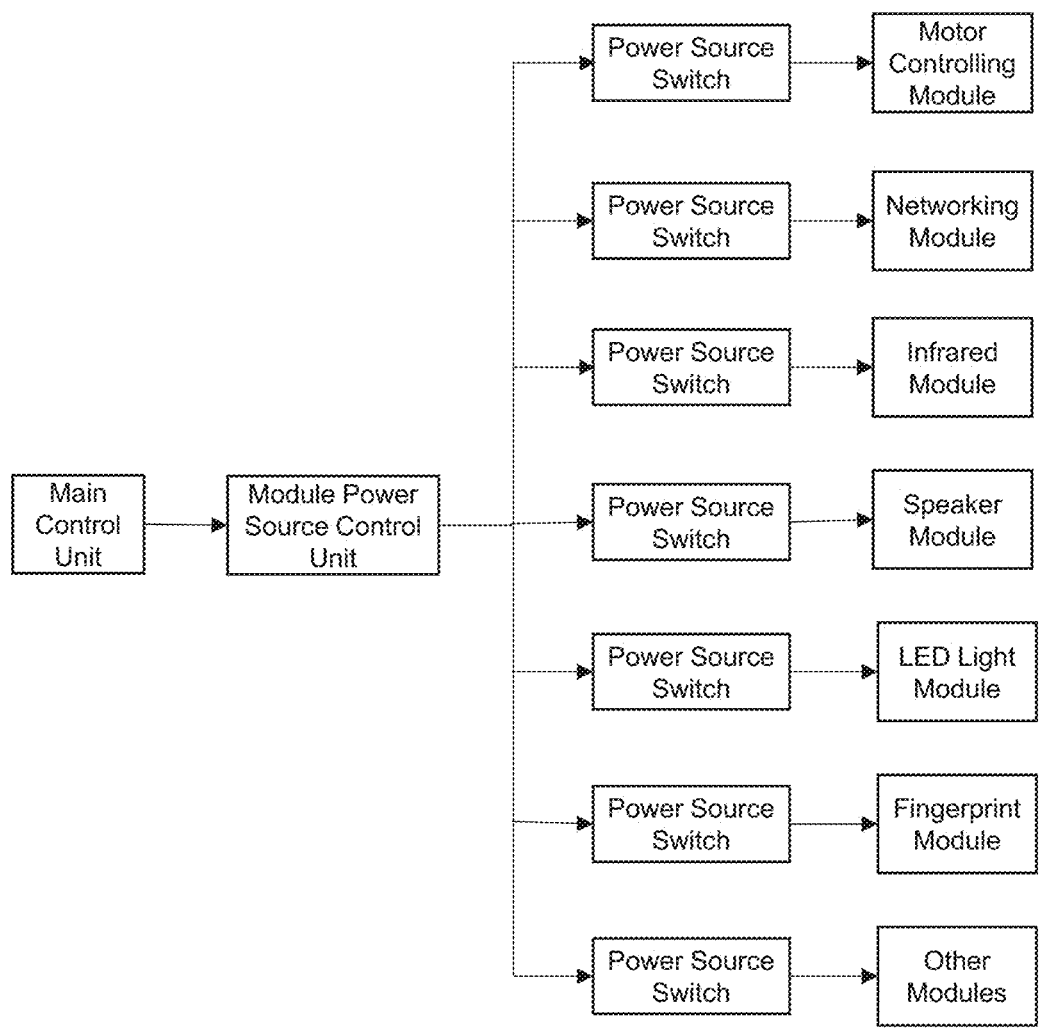
FIG. 5 is a schematic diagram illustrating an exemplary smart lock according to some embodiments of the present disclosure.

Referring to FIG. 5, main modules of the smart lock may be designed on hardware circuits independently and power source switches may be reserved. Each of the main modules of the smart lock may be connected to a module power source control unit by a corresponding power source switch. The module power source control unit may be connected to a main control unit of the smart lock.

A main control unit of the smart lock may operate power sources of different functional modules through the module power source control unit. When the smart lock recognizes that the power consumption of the lock itself is abnormal, different functional modules may be turned off through an adjustment strategy to save the power. In this way, the problem that the power consumption of the smart lock drops rapidly after an abnormal power consumption failure occurs during usage may be solved. The power consumption of the lock may be saved as much as possible by turning off part of the power sources in stages. In some embodiments, the main modules of the smart lock may include a motor controlling module, a networking module, an infrared module, a speaker module, an LED light module, a fingerprint module, other modules, or the like, or any combination thereof. In some embodiments, the motor controlling module may be used to control a motor of the smart lock. In some embodiments, the networking module may be used to control network connection of the smart lock. In some embodiments, the infrared module may be used to transmit and/or receive infrared signals. In some embodiments, the speaker module may be used to control a speaker of the smart lock. In some embodiments, the LED light module may be used to control a LED light of the smart lock. In some embodiments, the fingerprint module may be used to realize a fingerprint recognition function of the smart lock. In some embodiments, the other modules may be any functional module of the smart lock. In some embodiments, the motor controlling module, the networking module, the infrared module, the speaker module, the LED light module, the fingerprint module, and other modules may be controlled by the module power source control unit through a separate power source switch, respectively.

In addition, when the power consumption of the smart lock drops too fast, the smart lock may also set different transmission powers of a wireless radio frequency via software so as to reduce an electric quantity loss of the lock. For example, on the premise of ensuring sufficient receiving sensitivity, the transmission powers of the wireless radio frequency may be reduced by one or more grades.

The smart lock may reserve a USB socket for electric quantity supply using a backup power source. When the electric quantity of the lock is exhausted, the USB may be used to reboot the lock.

Application situations of the electric quantity management of the smart lock itself may include a situation of an abnormal electric quantity of the smart lock and a situation of a low electric quantity of the smart lock.

If the smart lock has abnormal electric quantity, whether the lock is in a high-power consumption status may need to be determined. In response to determining that the lock is in a high-power consumption status for 3 successive times, the lock may report an abnormal power consumption event to the server and notify the user that the lock is in an abnormal power consumption status through a push information from the server. In response to determining that the lock is in an abnormal power consumption status, power sources of some non-critical components (e.g., a power source of an infrared sensor module) may be turned off. The networking function may be turned off and only power sources of the motor controlling module, the fingerprint input module, the password input module of the lock may be turned on after reporting the abnormal power consumption status to minimize the power consumption of the smart lock.

For the smart lock that is operating at low electric quantity, a low electric quantity value of the smart lock may be divided into three levels, such as an imminent low electric quantity status, a low electric quantity status, or an electric quantity exhausted status. When the electric quantity of the smart lock is 20%-10%, the server may send a low electric quantity reminder to the user. When the electric quantity of the smart lock is lower than 10%, the server may send a battery replacing reminder to the user. At the same time, interactions of one or more buzzers and LEDs of the smart lock may be changed to remind the user that the electric quantity of the smart lock is too low. The electric quantity exhausted status represents that the electric quantity of the lock is 0%. At this time, the lock may shut down all working modules and enter a shutdown status. Only when a reserve power source of is used, the lock may be rebooted and used.

Figure 6:
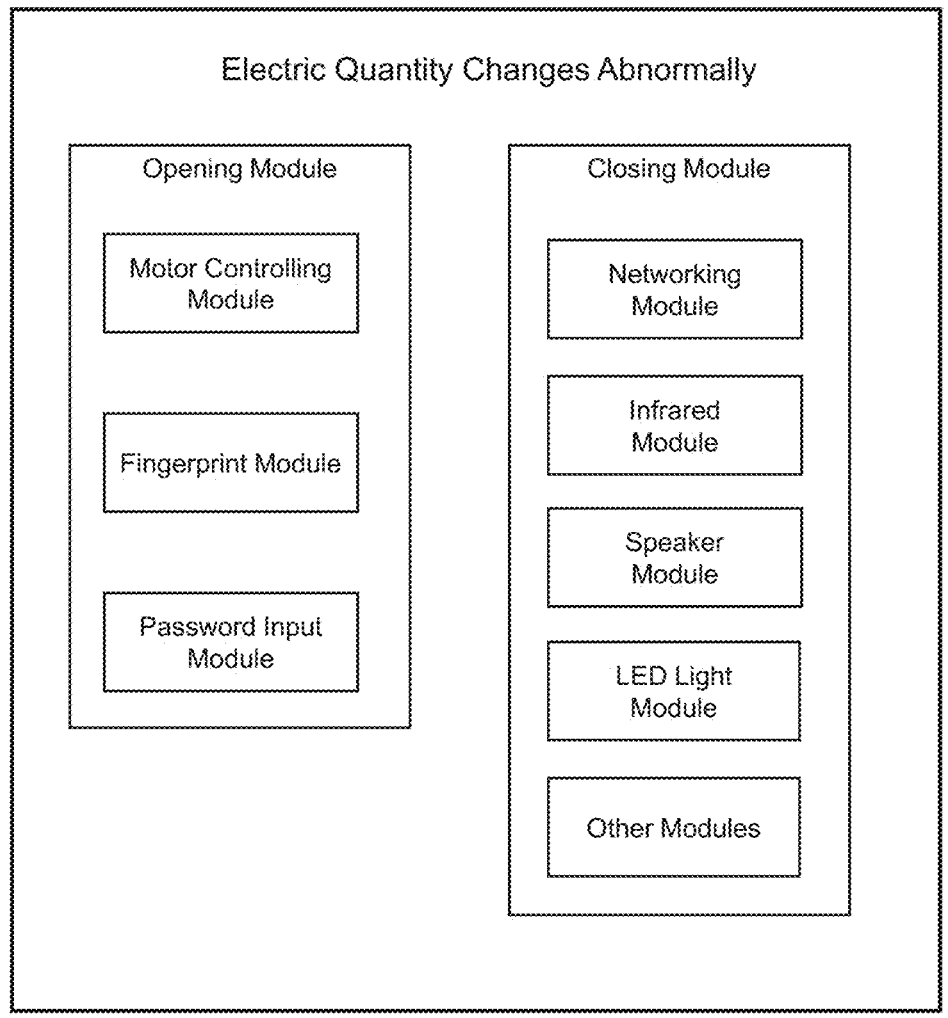
FIG. 6 is a schematic diagram illustrating an opening module and a closing module of a smart lock under an abnormal power consumption according to some embodiments of the present disclosure.

For example, when the smart lock determines that its power consumption is abnormal, the smart lock may automatically turn off some module functions and send a reminder to the server about the abnormal to reduce power consumption. FIG. 6 is a schematic diagram illustrating an opening module and a closing module of a smart lock under an abnormal power consumption according to some embodiments of the present disclosure. In some embodiments, the opening module may include a motor controlling module, a fingerprint module, a password input module, or the like, or any combination thereof. In some embodiments, the password input module may be used to receive a password of the smart lock input by a user. In some embodiments, the closing module may include a networking module, an infrared module, a speaker module, an LED light module, and other modules, or the like, or any combination thereof.

When it is detected that the smart lock is in a low electric quantity status, different operations may be performed corresponding to different statuses. The operations may include sending an electric quantity reminder to the client terminal when the smart lock is imminent low electric quantity status, sending an electric quantity reminder and local interaction reminder when the smart lock is in a low electric quantity status, or turning off all functions and waiting for a backup battery for rebooting the smart lock when the electric quantity is exhausted. The local interaction reminder may include a specific prompt sound generated by the smart lock for reminding the user.

Figure 7:
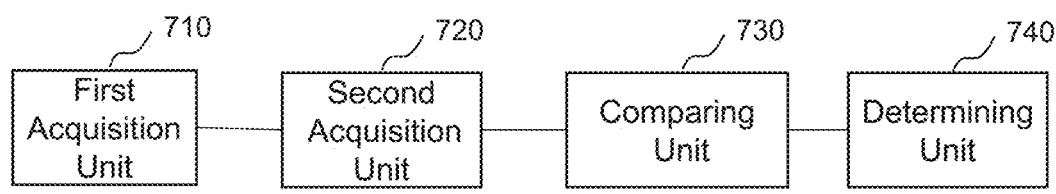
FIG. 7 is a schematic diagram illustrating an electric quantity management device according to some embodiments of the present disclosure.

FIG. 7 is a schematic diagram illustrating an electric quantity management device according to some embodiments of the present disclosure. The electric quantity management device may include a first acquisition unit 710, a second acquisition unit 720, a comparing unit 730, and a determining unit 740.

The first acquisition unit 710 may be configured to determine a first acquisition value at a preset reporting time by performing an electric quantity acquisition operation on a battery-powered device according to the determined preset reporting time.

The second acquisition unit 720 may be configured to determine a second acquisition value by performing an electric quantity acquisition operation on the battery-powered device. The generation time of the second acquisition value may be later than the generation time of the first acquisition value.

The comparing unit 730 may be configured to generate a comparison result by comparing the first acquisition value with the second acquisition value.

The determining unit 740 may be configured to determine an electric quantity reporting time of the battery-powered device and perform an electric quantity management operation of the battery-powered device based on the comparison result.

Based on the above-mentioned electric quantity management device, the first acquisition unit may include a first acquisition sub-unit, a first determining sub-unit, a calculation sub-unit, and a first recording sub-unit.

The first acquisition sub-unit may be configured to obtain a set of electric quantity acquisition values by performing an electric quantity acquisition operation according to a determined electric quantity acquisition time interval. The set of electric quantity acquisition values may include a plurality of electric quantity acquisition values.

The first determining sub-unit may be configured to determine a count of electric quantity acquisition values in the set of electric quantity acquisition values according to a first preset reporting time The calculation sub-unit may be configured to calculate an average value of the plurality of electric quantity acquisition values, and determine the average value as a first electric quantity acquisition value.

The first recording sub-unit may be configured to determine the first electric quantity acquisition value and a first time point corresponding to the first preset reporting time as the first acquisition value.

Optionally, the second acquisition unit may include a first determination sub-unit, a second calculation sub-unit, and a second recording sub-unit.

The first determination sub-unit may be configured to determine a time point corresponding to the first preset reporting time as a time point performing a first time of electric quantity acquisition operation, and acquire a preset count of electric quantity acquisition values at a preset time interval.

The second calculation sub-unit may be configured to calculate an average value of the electric quantity acquisition values, and determine the average value as a second electric quantity acquisition value.

The second recording sub-unit may be configured to obtain a second time point when the electric quantity was latest acquisition, and determine the second electric quantity acquisition value and the second time point as the second acquisition value.

Optionally, the comparison unit may include a third calculation sub-unit and a fourth calculation sub-unit.

The third calculation sub-unit may be configured to calculate an electric quantity difference between the first electric quantity acquisition value and the second electric quantity acquisition value.

The fourth calculation sub-unit may be configured to calculate a time difference between the second time point and the first time point.

Optionally, the determining unit may include a first judging sub-unit, a sending sub-unit, and a first management sub-unit.

The first judging sub-unit may be configured to determine whether the electric quantity difference is greater than a preset abnormal electric quantity change threshold. In response to determining that the electric quantity difference is greater than a preset abnormal electric quantity change threshold, whether the time difference is less than a preset abnormal detection time threshold may be determined. In response to determining that the electric quantity difference is greater than a preset abnormal electric quantity change threshold and that the time difference is less than a preset abnormal detection time threshold, an electric quantity value to be reported may be calculated according to the first acquisition value and the second acquisition value.

The sending sub-unit may be configured to send the electric quantity value to be reported to the server. Whether the smart lock is in high-power consumption status may be determined based on the electric quantity value to be reported.

The first management sub-unit may be configured to perform an electric quantity management operation for the smart lock being in the high-power consumption status.

When the battery-powered device has sent the electric quantity value to be reported to the server, the second acquisition unit may further include a second acquisition sub-unit and a fifth calculation sub-unit.

The second acquisition sub-unit may be configured to acquire the electric quantity value within a second preset reporting time range at a preset electric quantity acquisition time interval.

The fifth calculation sub-unit may be configured to calculate an average value of the electric quantity values within the second preset reporting time range, and determine the average value as the second electric quantity acquisition value. The second acquisition value may include the second electric quantity acquisition value and a second time point corresponding to the second preset reporting time.

Optionally, the second acquisition unit may further include a performing unit. The performing unit may include a second judging sub-unit and a performing sub-unit.

The second judging sub-unit may be configured to determine whether the comparison result meets a predetermined condition of a preset normal electric quantity status. In response to determining that the comparison result meets the predetermined condition, a first processing operation of the second acquisition value may be performed. The first processing operation may indicate that the second acquisition value is not reported to the server.

The performing sub-unit may be configured to report the second acquisition value to the server and perform a second processing operation for the battery-powered device. The second processing operation may indicate an electric quantity management performed on the battery-powered device which is in a low electric quantity status.

Optionally, the performing sub-unit may be configured to turn off a predetermined power consumption module of the battery-powered device.

The electric quantity management device may include a processor and a memory. The first acquisition unit, the second acquisition unit, the comparison unit, and the determination unit may be stored as program units in the memory. The program units stored in the memory may be executed by the processor to realize corresponding functions.

The processor may contain one or more kernels. The kernels may invoke the corresponding program unit(s) stored in the memory. The user experience may be improved by adjusting parameters of the kernels.

The memory may include a non-persistent memory, a random access memory (RAM), and/or a non-volatile memory in a computer readable medium. For example, a read only memory (ROM) or a flash memory. The memory may include at least one memory chip.

The embodiments of the present disclosure provide a storage medium which stores one or more programs. The electric quantity management method may be implemented when the programs are executed by a processor.

The embodiments of the present disclosure provide a processor. The processor may be used to execute one or more programs. The electric quantity management method may be implemented when the programs are executed by the processor.

In some embodiments of the present disclosure, when the electric quantity value to be reported is sent to the server, if the sending is unsuccessful, the first acquisition value, the second acquisition value, and the electric quantity value to be reported may be stored locally as historical record information in the memory, such as stored in Flash. When the device is connected to the server again, the historical record information data may be retransmitted to the server. More detailed description may be found in FIG. 8.

Figure 8:
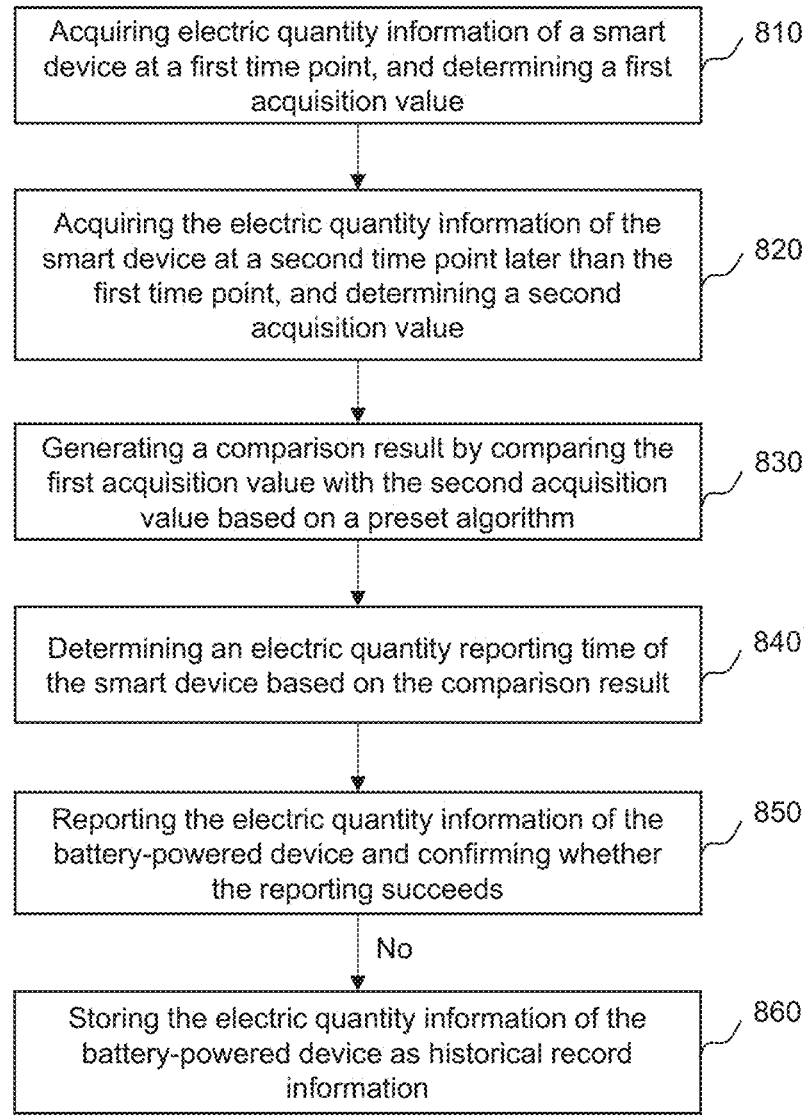
FIG. 8 is a flowchart illustrating another electric quantity management method according to some embodiments of the present disclosure.

FIG. 8 is a flowchart illustrating another electric quantity management method according to some embodiments of the present disclosure. In some embodiments, one or more operations in the process 800 may be implemented in the electric quantity management device.

In 810, electric quantity information of a smart device may be acquired at a first time point, and a first acquisition value may be determined. In some embodiments, operation 810 may be implemented by the first acquisition unit.

In some embodiments, the first time point may be a preset time point or a preset time interval. The first acquisition value may include a first electric quantity acquisition value and the first time point.

In 820, the electric quantity information of the smart device may be acquired at a second time point later than the first time point, and a second acquisition value may be determined. Operation 820 may be implemented by the second acquisition unit.

In some embodiments, the second time point may be a time point preset based on the first time point. Specifically, the second time point may be a time point later than the first time point and having a certain time interval from the first time point. The time interval between the first time point and the second time point may be set according to the battery performance of the battery-powered device or performance of the server to which the electric quantity data is reported. The second acquisition value may include a second electric quantity acquisition value and a second time point.

In 830, a comparison result may be generated by comparing the first acquisition value with the second acquisition value based on a preset algorithm. Operation 830 may be implemented by the comparison unit.

In some embodiments, the comparison may include comparisons of the electric quantity acquisition values and the acquisition times between the first acquisition value and the second acquisition value. The comparison result may include a difference between the first electric quantity acquisition value and the second electric quantity acquisition value and a difference between the second time point and the first time point.

In 840, an electric quantity reporting time of the smart device may be determined based on the comparison result. Operation 840 may be implemented by the determining unit.

In some embodiments, a determination as to whether the comparison result needs to be reported to the server 110 may be made based on the differences in the comparison result. For example, if the differences in the comparison result are less than preset values, the result may not be reported. If the differences in the comparison result are greater than preset values, the result may be reported.

In 850, the electric quantity information of the battery-powered device may be reported and whether the reporting succeeds may be confirmed. Operation 850 may be implemented by the determining unit.

In some embodiments, the electric quantity information may be a comparison result of the first acquisition value and the second acquisition value. In some embodiments, the server 110 may send feedback information to the smart device 130 after the report information is received. After the smart device 130 receives the feedback information from the server, the electric quantity information may be reported successfully.

If the electric quantity information is reported successfully, the electric quantity management device may not perform any operation. The server 110 may also determine whether the electric quantity management device needs to perform subsequent operations. If the electric quantity information is reported unsuccessfully, operation 860 may be performed.

In 860, the electric quantity information of the battery-powered device may be stored as historical record information. Operation 860 may be performed by a storage device of the smart device.

In some embodiments, the historical record information may include the first acquisition value, the second acquisition value, and the comparison result. In some embodiments, the historical record information may be re-reported to the server 110 at any other time.

The above-mentioned storing the information related to the electric quantity that has failed to be reported locally in the form of historical record information may also be applied to scenarios of other embodiments, which are described in detail as follows.

Some embodiments of the present disclosure also provide methods and devices for storing historical record information. In some embodiments, information of the smart device may fail to be reported to the server based on a communication status of the smart device. When information of the smart device may fail to be reported to the server, the information may be stored as historical record information in one or more storages of the smart device. The failure may be caused by conditions that the device is offline or the network status is unstable. When the device is back online or the network status is stable, the device may re-report the stored historical record information to the server so that the server may perform designated operations related to the device.

In some embodiments, the communication status of the smart device may include at least a data transfer status of the smart device. One or more processors may be configured to cause the system to perform one or more following operations. The system may determine whether to generate historical record information based on the data transfer status. In response to determining that the data transfer status is a failure status, the system may generate the historical record information based on data that fails to be transmitted and store the historical record information locally. In some embodiments, the transfer status may include a transfer success status and a transfer failure status. The historical record information may be stored in the storages of the smart device, for example, stored in Flash. In some embodiments, the historical record information may be stored in a storage location corresponding to a write pointer in forms of header information and valid information. The header information may reflect at least one of a data status, a data type, or an effective data length of the historical record information. The valid information may reflect data content of the historical record information. The write pointer may indicate the location where the current data is written.

Figure 9:
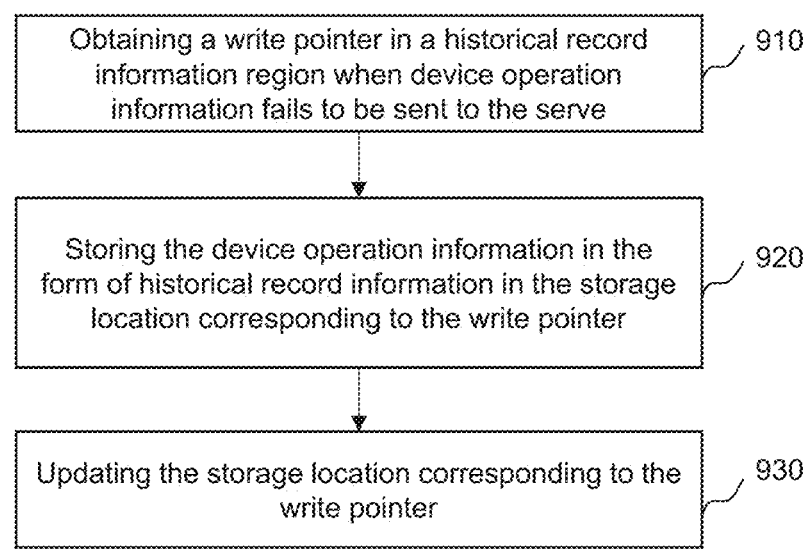
FIG. 9 is a flowchart illustrating a historical record information storage method according to some embodiments of the present disclosure.

FIG. 9 is a flowchart illustrating a historical record information storage method according to some embodiments of the present disclosure. The historical record information storage method may be applied to any smart devices, such as a smart lock, a smart meter, etc.

In 910, a write pointer in a historical record information region may be obtained when device operation information fails to be sent to the server.

it should be noted that when the smart device is powered on and the smart device generates the device operation information, the smart device may send the device operation information to the server. When the device operation information fails to be sent to the server, the device operation information may be determined as the historical record information.

A reason for the failure to send device operation information may be that the smart device is offline, a network status of the smart device is unstable, etc.

An example that the smart device includes a smart lock and a smart meter may be provided. The device operation information may include information of the lock opening, information of the lock closing, information of ammeter tripping, information of ammeter closing, information of over-electric quantity value, information of over-power, etc.

The historical record information region may be the flash memory of the smart device. The historical record information region may include multiple information storage regions. Each information storage region may correspond to a storage location, and each information storage region may store a piece of historical record information.

The write pointer in the historical record information region may indicate the storage location of an available information storage region in the historical record information region.

In 920, the device operation information may be stored in the form of historical record information in the storage location corresponding to the write pointer.

Specifically, the device operation information may be converted into the historical record information for storage. The historical record information may include a data status, a data type, an effective data length, a data validity identifier, or valid data.

The data status may include a status that the data has been sent to the server and a status that the data has not been sent to the server.

The data type may indicate different smart device events. Taking a smart electric meter as an example, the data type may include an electric meter tripping event, an electric meter closing event, an over-electric quantity event, an over-power event, etc.

The effective data length may correspond to the data type. Different data types may correspond to different effective data lengths.

The data validity identifier may be validity or invalidity.

The valid data may be data content of the valid data.

Based on the structure of the historical record information provided by this embodiment, the length of the historical record information may be variable. The extendibility and adaptability of the historical record may be achieved. For example, a length of effective information of a lock opening event may be 10, and a length of effective information of the lock closing event may be 12. Through a management of variable lengths, records of different types may be managed conveniently in a unified manner.

In 930, the storage location corresponding to the write pointer may be updated.

The updating method may include moving the write pointer when a new historical record is written successfully. The write pointer may automatically shift to a certain position according to a size of the historical record so as to ensure that the next historical record may be written normally. Specifically, the write pointer corresponding to an information storage region next to the information storage region corresponding to the current write pointer may be determined as an updated write pointer. That is, the storage location corresponding to the updated write pointer may be a storage location next to the current storage location storing the historical record information in the historical record information region.

This embodiment discloses a historical record information storage method. When the device operation information fails to be sent to the server, the device operation information may be stored in the form of historical record information according to the write pointer in the historical record information region, and the storage location corresponding to the write pointer may be updated after the device operation information is stored, so that the storage of subsequent historical record information may not need to use a file system, which may simplify the storage process of historical record information and reduce operations for historical record storage.

Figure 10:
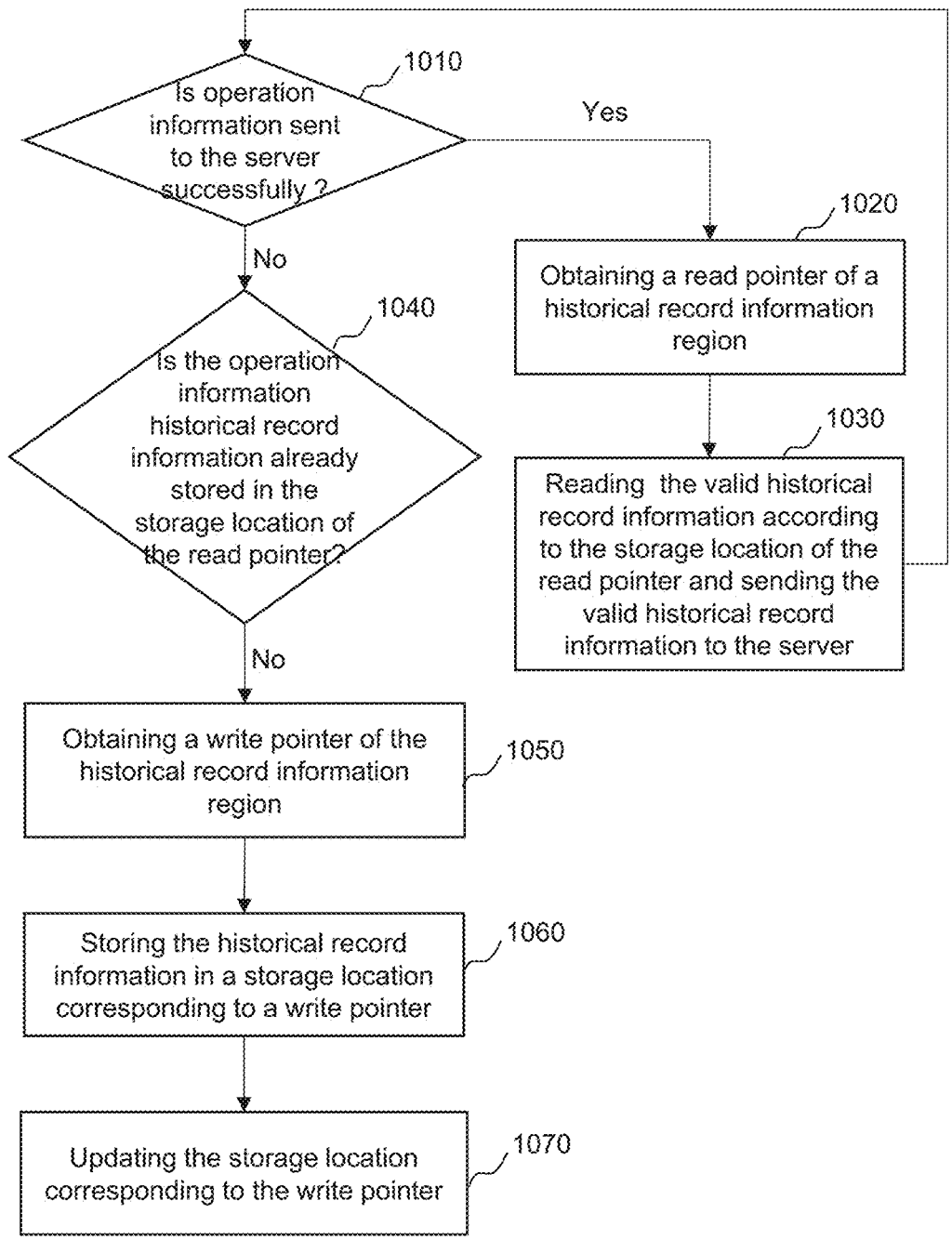
FIG. 10 is a flowchart illustrating another historical record information storage method according to some embodiments of the present disclosure.

FIG. 10 is a flowchart illustrating another historical record information storage method according to some embodiments of the present disclosure.

In 1010, a determination as to whether operation information is sent to the server successfully may be made.

It should be noted that the operation information may include device operation information or valid historical record information. In some embodiments, whether operation information is sent to the server successfully may be determined based on header information of the historical record information. When the operation information is sent successfully, the server may return a response information of sending success, and the device may update the header information when the response information is received.

In response to determining that the operation information is sent to the server successfully, operation 1020 may be performed.

In 1020, a read pointer of a historical record information region may be obtained.

Specifically, a current read pointer of the historical record information region may be obtained. A determination as to whether a storage location corresponding to the current read pointer is marked with an abnormal data identifier may be made.

Figure 11:
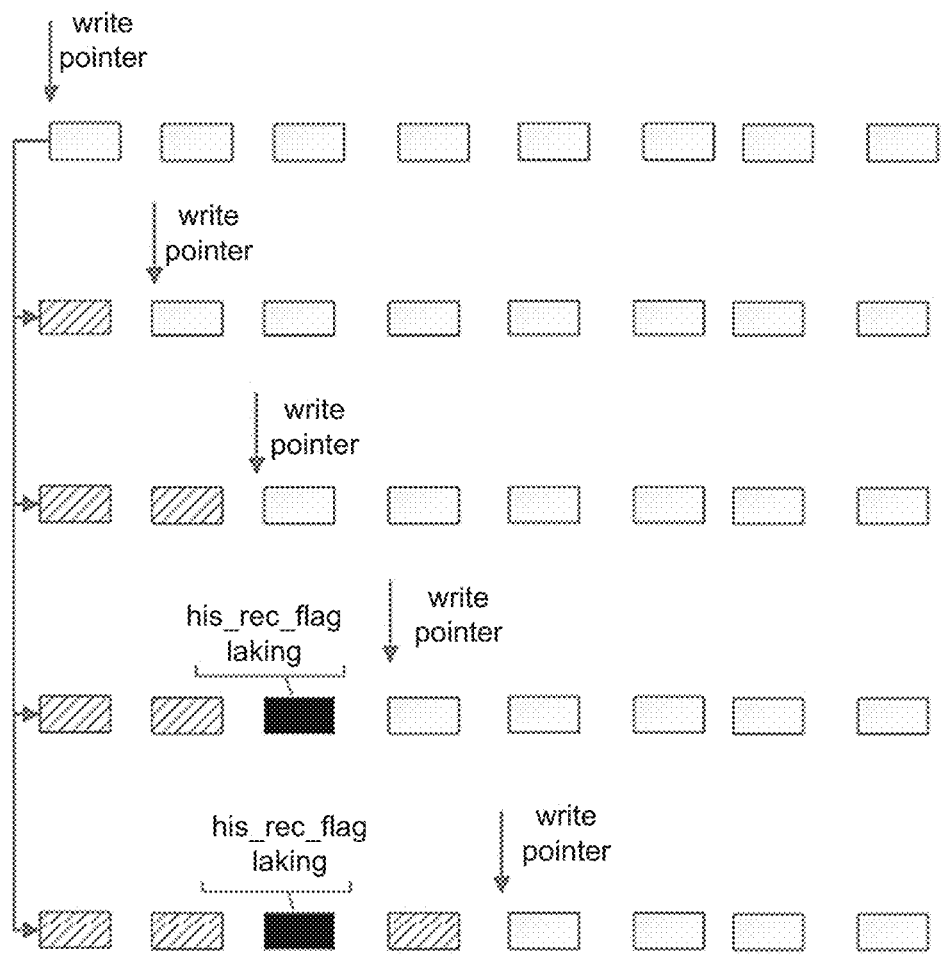
FIG. 11 is a flowchart illustrating another historical record information storage method according to some embodiments of the present disclosure.

As shown in FIG. 11, if abnormal situations, such as power failure, device restart, etc., occur when the historical record information is written into the historical record information region, the abnormal data identifier his_rec_flag may be marked in a location where the historical record information is stored.

In response to determining that the storage location corresponding to the current read pointer is marked with an abnormal data identifier, a read pointer corresponding to the storage location next to the storage location corresponding to the current read pointer in the historical record information region may be determined as the current read pointer, and whether the storage location corresponding to the current read pointer is marked with an abnormal data identifier may be determined.

In response to determining that the storage location corresponding to the current read pointer is not marked with an abnormal data identifier, the current read pointer may be determined as the read pointer of the historical record information region.

When a smart device sending the operation information to the server, data marked with an abnormal data identifier may be discarded to avoid sending junk data.

In 1030, the valid historical record information may be read according to the storage location of the read pointer and sent to the server. After operation 1030 is performed, the process may return back to operation 1010.

it should be noted that the valid historical record information is historical record information without the abnormal data identifier.

If the valid historical record information fails to be sent, operation 1040 may be performed. In 1040, a determination as to whether the operation information is historical record information already stored in the storage location of the read pointer may be made.

In response to determining that the operation information is historical record information already stored in the storage location of the read pointer, any operation may not be performed. In response to determining that the operation information is not historical record information already stored in the storage location of the read pointer, operation 1050 may be performed. In 1050, a write pointer of the historical record information region may be obtained.

It is understood that the "the operation information is not historical record information already stored in the storage location of the read pointer" used herein specifically refers that the operation information fails to be sent to the server and the operation information is not historical record information.

In 1060, the historical record information may be stored in a storage location corresponding to the write pointer.

In 1070, the storage location corresponding to the write pointer may be updated.

The above embodiment discloses the sending and storage process of the historical record information. Historical record information storage based on the write pointer and historical record information sending based on the read pointer may be realized.

It should be noted that after the read pointer of the historical record information region is obtained, the method may further include determining whether a count of historical record information has been sent in the historical record information region is greater than a preset maximum storage amount according to the read pointer of the historical record information region. In response to determining that the count of the historical record information has been sent in the historical record information region is greater than a preset maximum storage amount, the historical record information has been sent in a sector of xxx with the earliest storage time in the historical record information region may be erased, and the storage location corresponding to the read pointer may be updated. In response to determining that the count of the historical record information has been sent in the historical record information region is not greater than the preset maximum storage amount, the valid historical record information may be read and sent to the server according to the storage location of the read pointer.

It should also be noted that, after the write pointer of the historical record information region is obtained, the method may further include determining whether a count of the historical record information stored in the historical record information region is greater than the preset maximum storage amount. In response to determining that the count of the historical record information stored in the historical record information region is greater than a preset maximum storage amount, the historical record information in a sector with the earliest storage time in the historical record information region may be erased, and the storage location corresponding to the write pointer may be updated. In response to determining that the count of the historical record information stored in the historical record information region is not greater than the preset maximum storage amount, the historical record information may be stored in a storage location corresponding to the write pointer.

The preset maximum storage amount refers to a preset storage region, which may be a sector of a flash memory. Only when the historical record information has been sent in the historical record information region is greater than the preset maximum storage amount, the historical record information has been sent in the sector with the earliest storage time in the historical record information region may be erased, and only when the stored historical record information is greater than the preset maximum storage amount, the historical record information in the sector with the earliest storage time in the historical record information region may be erased, which may reduce a count or number of flash memory erasing and writing operations and avoid frequent flash memory reading and writing, thereby extending a service life of the flash memory of the smart device.

Figure 12:
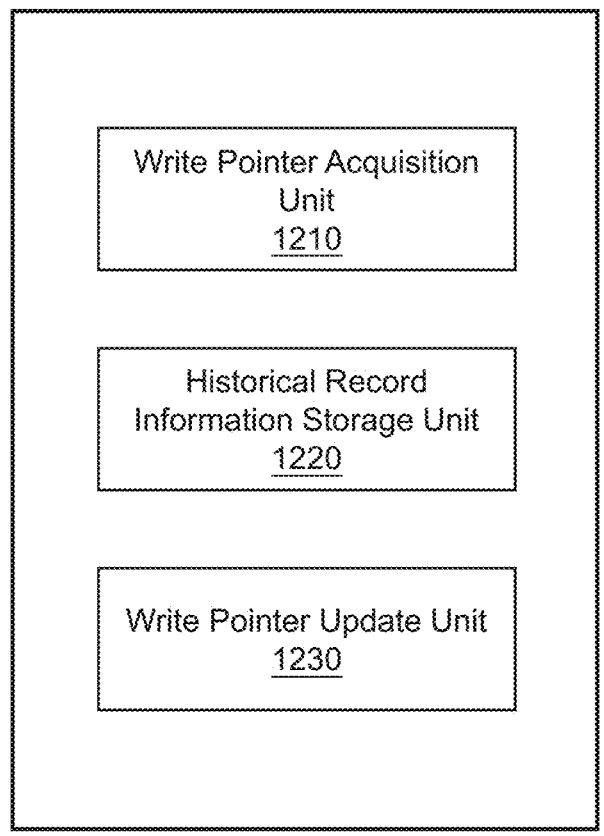
FIG. 12 is a schematic diagram illustrating a historical record information storage device according to some embodiments of the present disclosure.

Based on the historical record information storage method disclosed in the above embodiments, FIG. 12 is a schematic diagram illustrating a historical record information storage device according to some embodiments of the present disclosure. The historical record information storage device may include a write pointer acquisition unit 1210, a historical record information storage unit 1220, and a write pointer update unit 1230.

The write pointer acquisition unit 1210 may be configured to obtain a write pointer in a historical record information region when device operation information fails to be sent to the server.

The historical record information storage unit 1220 may be configured to store the device operation information in a storage location corresponding to the write pointer in the form of historical record information.

The write pointer update unit 1230 may be configured to update the storage location corresponding to the write pointer.

Optionally, the device may further include a first judging unit. The first judging unit may be configured to determine operation information is sent to the server successfully. The operation information may include device operation information or valid historical record information. In response to determining that the operation information is sent to the server successfully, a read pointer acquisition unit may be triggered. The read pointer acquisition unit may be configured to obtain a read pointer of the historical record information region. An information reporting unit configured to read valid historical record information according to the storage location of the read pointer, send the valid historical record information to the server, and trigger the first judgment unit. In response to determining that the operation information fails to be sent to the server, a second judgment unit may be triggered. The second judgment unit may be configured to determine whether the operation information is historical record information already stored in the storage location of the read pointer. In response to determining that the operation information is historical record information already stored in the storage location of the read pointer, any operation does not be performed. In response to determining that the operation information is not historical record information already stored in the storage location of the read pointer, the write pointer acquisition unit may be triggered.

Optionally, the device may further include a third judging unit. The third judging unit may be configured to determine whether a count of historical record information stored in the historical record information region is greater than a preset maximum storage amount according to the storage location of the write pointer. In response to determining that the count of the historical record information stored in the historical record information region is greater than the preset maximum storage amount, a first erasing unit may be triggered and the storage location corresponding to the write pointer may be updated. The first erasing unit may be configured to eras the historical record information in a sector with the earliest storage time in the historical record information region. In response to determining that the count of the historical record information stored in the historical record information region is not greater than the preset maximum storage amount, the historical record information storage unit may be triggered.

Optionally, the device may further include a fourth judging unit. The fourth judging unit may be configured to determine whether a count of historical record information has been sent in the historical record information region is greater than the preset maximum storage amount according to the read pointer of the historical record information region.

Optionally, the read pointer acquisition unit may include an acquisition sub-unit and a judging sub-unit. The acquisition sub-unit may be configured to obtain a current read pointer in the historical record information region. The judging sub-unit may be configured to determine whether a storage location corresponding to the current read pointer is marked with an abnormal data identifier. In response to determining that the storage location corresponding to the current read pointer is marked with an abnormal data identifier, a second determination sub-unit and the judging sub-unit may be triggered. The second determination sub-unit may be configured to determine a read pointer corresponding to a storage location next to the storage location corresponding to the current read pointer in the historical record information region as the current read pointer. In response to determining that the storage location corresponding to the current read pointer is not marked with an abnormal data identifier, a second determining sub-unit may be triggered. The second determining sub-unit may be configured to determine the current read pointer as the read pointer of the historical record information region.

This embodiment discloses a historical record information storage device. When the device operation information fails to be sent to the server, the device operation information may be stored in the form of historical record information according to the write pointer in the historical record information region, and the storage location corresponding to the write pointer may be updated after the device operation information is stored, so that the subsequent storage of historical record information may not need to use a file system, which may simplify the storage process of historical record information and reduce operations for historical record storage.

The historical record information storage device may include a processor and a memory. The write pointer acquisition unit, the historical record information storage unit, and the write pointer update unit may be stored as program units in the memory. The program units stored in the memory may be executed by the processor to realize corresponding functions.

The processor may contain one or more kernels. The kernels may invoke the corresponding program unit(s) stored in the memory. The efficiency of historical record information storage may be improved by adjusting parameters of the kernels.

The memory may include a non-persistent memory, a random access memory (RAM), and/or a non-volatile memory in a computer readable medium. For example, a read only memory (ROM) or a flash memory. The memory may include at least one memory chip.

The embodiments of the present disclosure provide a storage medium which stores one or more programs. The historical record information storage method may be implemented when the programs are executed by a processor.

The embodiments of the present disclosure provide a processor. The processor may be used to execute one or more programs. The historical record information storage method may be implemented when the programs are executed by the processor.

The embodiment of the present disclosure provides a device. The device includes a processor, a memory, and a program stored on the memory and executed by the processor. When the processor executes the program, the following operations may be implemented. When the device operation information fails to be sent to the server, the write pointer in the historical record information region may be obtained. The device operation information may be stored in the storage location corresponding to the write pointer in the form of historical record information. The storage location corresponding to the write pointer may be updated.

Further, the method may further include determining whether the operation information is sent to the server successfully. The operation information may include device operation information or valid historical record information. In response to determining that the operation information is sent to the server successfully, a read pointer of the historical record information region may be obtained. The valid historical record information may be read according to the storage location of the read pointer and sent to the server. After the valid historical record information is sent, whether the valid historical record information is sent to the server successfully may be determined. If the valid historical record information fails to be sent, whether the operation information is historical record information already stored in the storage location of the read pointer may be determined. In response to determining that the operation information is historical record information already stored in the storage location of the read pointer, any operation does not be performed. In response to determining that the operation information is not historical record information already stored in the storage location of the read pointer, a write pointer of the historical record information region may be obtained.

Further, after the write pointer of the historical record information region is obtained, the method may further include determining whether a count of historical record information stored in the historical record information region is greater than a preset maximum storage amount according to the storage location of the write pointer. In response to determining that the count of the historical record information stored in the historical record information region is greater than the preset maximum storage amount, the historical record information in a sector with the earliest storage time in the historical record information region may be erased, and the storage location corresponding to the write pointer may be updated. In response to determining that the count of the historical record information stored in the historical record information region is not greater than the preset maximum storage amount, the historical record information may be stored in a storage location corresponding to the write pointer.

Further, after the read pointer of the historical record information region is obtained, the method may further include determining whether a count of historical record information has been sent in the historical record information region is greater than the preset maximum storage amount according to the read pointer of the historical record information region. In response to determining that the count of the historical record information has been sent in the historical record information region is greater than the preset maximum storage amount, the historical record information has been sent in a sector with the earliest storage time in the historical record information region may be erased, and the storage location corresponding to the read pointer may be updated. In response to determining that the count of the historical record information has been sent in the historical record information region is not greater than the preset maximum storage amount, the valid historical record information may be read and sent to the server according to the storage location of the read pointer.

Further, the obtaining the read pointer of the historical record information region may include obtaining a current read pointer of the historical record information region and determining whether a storage location corresponding to the current read pointer is marked with an abnormal data identifier. In response to determining that the storage location corresponding to the current read pointer is marked with an abnormal data identifier, a read pointer corresponding to a storage location next to the storage location corresponding to the current read pointer in the historical record information region may be determined as the current read pointer. In response to determining that the storage location corresponding to the current read pointer is not marked with an abnormal data identifier, the current read pointer may be determined as the read pointer of the historical record information region.

Further, the historical record information may include a data status, a data type, an effective data length, a data validity identifier, or valid data.

This the present disclosure also provides a computer program product. When executed on a data processing device, the computer program product may be suitable for performing the following one or more operations. When the device operation information fails to be sent to the server, the write pointer of the historical record information region may be obtained. The device operation information may be stored in the storage location corresponding to the write pointer in the form of historical record information. The storage location corresponding to the write pointer may be updated.

Further, the method may further include determining whether the operation information is sent to the server successfully. The operation information may include device operation information or valid historical record information. In response to determining that the operation information is sent to the server successfully, a read pointer of the historical record information region may be obtained. The valid historical record information may be read according to the storage location of the read pointe and sent to the server. After the valid historical record information is sent, whether the valid historical record information is sent to the server successfully may be determined. If the valid historical record information fails to be sent, whether the operation information is historical record information already stored in the storage location of the read pointer may be determined. In response to determining that the operation information is historical record information already stored in the storage location of the read pointer, any operation does not be performed. In response to determining that the operation information is not historical record information already stored in the storage location of the read pointer, a write pointer of the historical record information region may be obtained.

Further, after the write pointer of the historical record information region is obtained, the method may further include determining whether a count of historical record information stored in the historical record information region is greater than a preset maximum storage amount according to the storage location of the write pointer. In response to determining that the count of the historical record information stored in the historical record information region is greater than the preset maximum storage amount, the historical record information in a sector with the earliest storage time in the historical record information region may be erased, and the storage location corresponding to the write pointer may be updated. In response to determining that the count of the historical record information stored in the historical record information region is not greater than the preset maximum storage amount, the historical record information may be stored in a storage location corresponding to the write pointer.

Further, after the read pointer of the historical record information region is obtained, the method may further include determining whether a count of historical record information has been sent in the historical record information region is greater than the preset maximum storage amount according to the read pointer of the historical record information region. In response to determining that the count of the historical record information has been sent in the historical record information region is greater than the preset maximum storage amount, the historical record information has been sent in a sector with the earliest storage time in the historical record information region may be erased, and the storage location corresponding to the read pointer may be updated. In response to determining that the count of the historical record information has been sent in the historical record information region is not greater than the preset maximum storage amount, the valid historical record information may be read and sent to the server according to the storage location of the read pointer.

Further, the obtaining the read pointer of the historical record information region may include obtaining a current read pointer of the historical record information region and determining whether a storage location corresponding to the current read pointer is marked with an abnormal data identifier. In response to determining that the storage location corresponding to the current read pointer is marked with an abnormal data identifier, a read pointer corresponding to a storage location next to the storage location corresponding to the current read pointer in the historical record information region may be determined as the current read pointer. In response to determining that the storage location corresponding to the current read pointer is not marked with an abnormal data identifier, the current read pointer may be determined as the read pointer of the historical record information region.

Further, the historical record information may include a data status, a data type, an effective data length, a data validity identifier, or valid data.

In some embodiments, the smart device may include a smart lock. Among many functional modules of the smart lock, two modules for status management of the smart lock and password management of the smart lock are very important. The status management of the smart lock may be performed by determining status information (e.g., a locking status of the lock) of the smart lock according to status information of a first component and status information of a second component of the smart lock. The password management of the smart lock may be performed by the server by managing the way of issuing or using the lock password.

According to the smart lock status management method of some embodiments of the present disclosure, the status information of the smart lock may be determined based on the status information of the first component and the second component of the smart lock. There is no need to retrofit and install the door magnetic device on the lock, which has a low cost. In some embodiments, the dangerous status may be determined according to preset rules, and reminder information may be sent to the user terminal in time to avoid potential safety hazards. According to the smart lock password management method of some embodiments of the present disclosure, when the lock is offline, the server may generate an activation code and send the activation code to the user terminal. A lock controller of the smart lock may obtain the activation code according to the user's input operation, and obtain the offline password by resolving the activation code. Therefore, the lock controller may obtain the password issued by the server when the lock is offline.

In other embodiments, the status management method and password management method of the smart lock described above may also be applied to status managements and password managements of other smart devices other than the smart lock which need to set usage rights or need to monitor a status of usage, such as a smart safe. The status management method and password management method of the smart device may be described in detail below in conjunction with specific embodiments.

Some embodiments of the present disclosure provide methods and devices for reminding status information of a smart device. The smart device may determine status information of the smart device by obtaining status information of a first component and status information of a second component. When the status information of the smart device meets a preset condition, reminder information containing the status information of the smart device may be generated. In some embodiments, the smart device may directly generate corresponding reminder information according to a security policy, and send the reminder information to the server 110 via the network 120. The server 110 may perform subsequent operations. In some embodiments, the smart device may also send the status information or the reminder information of the smart device to the server 110 via the network 120 according to a security policy or a preset rule. The server 110 may generate the corresponding reminder information according to the status information sent by the smart device and the security policy, and determine operations to be performed. For example, the server may send the reminder information to the user terminal 140 correlated with the smart device according to a preset rule. As another example, the server 110 may control the smart lock to issue an alarm through network commands. In some embodiments, the smart device may also directly send the status information and/or the reminder information of the smart device to the user terminal 140 correlated with the smart device through the network 120. For example, the status information of the smart device may be directly displayed in the user terminal 140 in real time through network sharing.

In some embodiments, the status information or reminder information of the smart device may be stored as historical record information in the storage region of the smart device after a failure of sending the status information or reminder information to the server. When the smart device is able to send information to the server, the historical record information may be transmitted to the server for performing subsequent operations. In the following, the smart lock may be used as one of the embodiments of the smart device to introduce methods and devices for reminding status information of the smart device in the present disclosure in detail.

Figure 13:
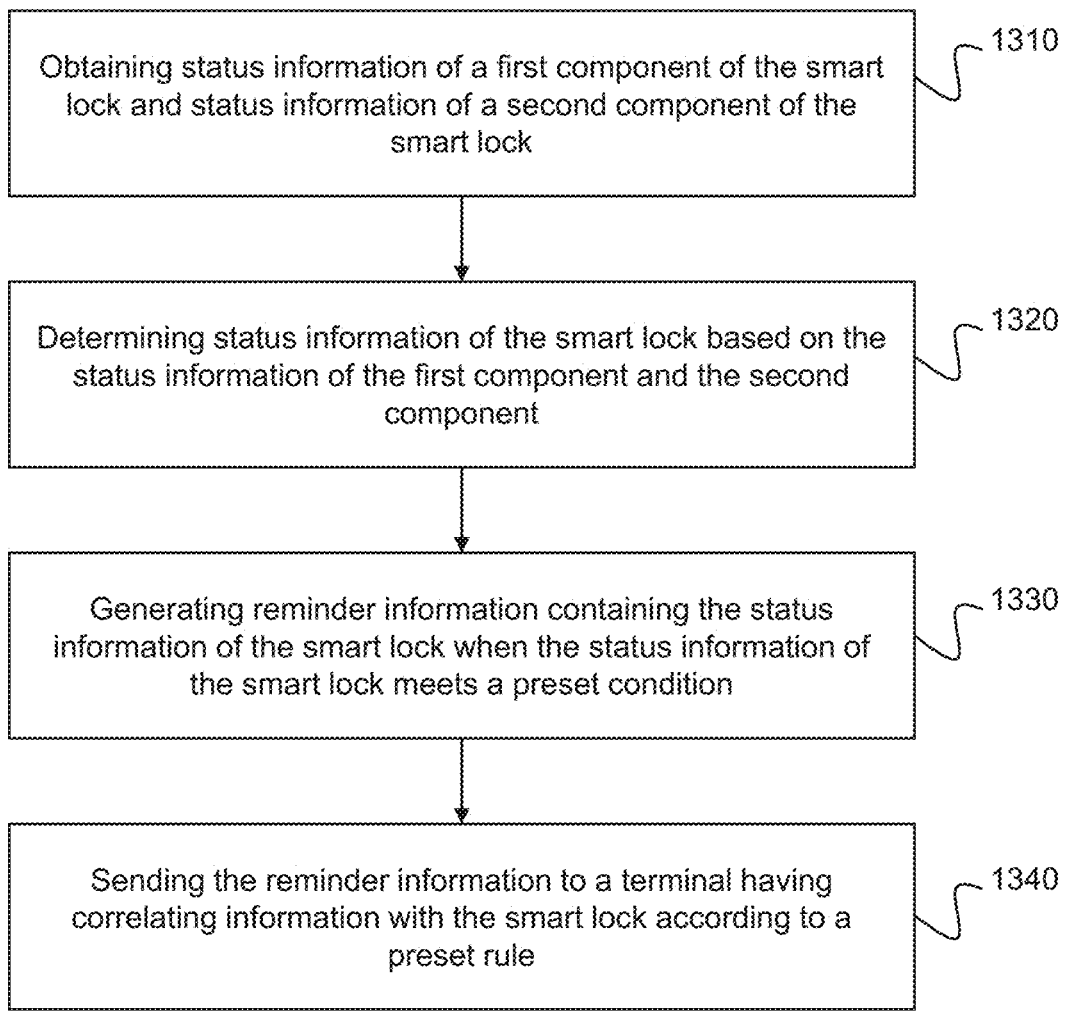
FIG. 13 is a flowchart illustrating an exemplary process for reminding status information of a smart lock according to some embodiments of the present disclosure.

FIG. 13 is a flowchart illustrating an exemplary process for reminding status information of a smart lock according to some embodiments of the present disclosure. The process is a specific application of the smart device controlling method. The status information of the smart lock may be determined based on hardware information of the smart lock. In some embodiments, safety reminder information may be generated by combining the status information of the smart lock with relevant information of the house to which the smart lock belongs, and sent to a corresponding terminal.

Although one or more technical solutions of the present disclosure are described in combination with smart locks, the present disclosure is not limited to be applied on smart locks, and may also be applied to smart devices other than smart locks. The smart devices include but not limited to a smart appliance, a smart storage cabinet, a shared device, etc. In one or more technical solutions of the present disclosure, the smart locks or other smart devices may be applied to the following scenarios: commercial housing (e.g., a hotel, an apartment, etc.), civilian housing (e.g., a homeowners' house, a rental house, etc.), office buildings (e.g., an office, a training room), commercial building (e.g., a shop, a shopping mall), etc.

In some embodiments, as shown in FIG. 13, the process for reminding status information of a smart lock may be applied on a server. A server may include a cloud server or a local server.

In 1310, the server may obtain status information of a first component of the smart lock and status information of a second component of the smart lock. The status information of the first component may indicate an opening status or a closing status of the door, and the status information of the second component may indicate a locking status of the lock.

The status information of the first component and the second component of the smart lock may be acquired by the server actively, or uploaded to the server by the smart lock according to a preset rule.

Specifically, the operation for obtaining of the status information of the first component and the second component of the smart lock may have different implementation manners. For example, the server may receive the status information of the first component and the second component uploaded by the smart lock in a preset frequency, or send an obtaining request for the status information to the smart lock and receive the status information of the first component and the second component sent by the smart lock according to the obtaining request.

In other embodiments, the operation for obtaining of the status information of the first component and the second component of the smart lock may also include receiving the status information of the first component and the second component which is uploaded by the smart lock when a status of the smart lock changes.

In 1320, the server may determine status information of the smart lock based on the status information of the first component and the second component.

In some embodiments, a lock body of the smart lock may include a main lock tongue and a latch bolt. In some embodiments, for the lock body that includes both the main lock tongue and the latch bolt, the second component may be the latch bolt of the lock body, and the latch bolt may have a retracted status and an ejected status. In some embodiments, the latch bolt may be driven by a motor to be in the retracted status or in the ejected status. In some embodiments, the motor may also drive the main lock tongue to extend out of the lock body or retract into the lock body, and when the main lock tongue is retracted, the motor may drive the latch bolt to retract. In some embodiments, the latch bolt may also be manually driven by the user to be in the retracted status or in the ejected status. For example, the latch bolt may be drive-connected with the door handle, and the user can drive the latch bolt to retract by pressing the door handle. When the main lock tongue is retracted into the lock body and the latch bolt is retracted, the lock body is unlocked.

In some embodiments, the first component may be a thimble (detection tongue). The thimble may have a retracted status and an ejected status. The second component may be a latch bolt. The latch bolt may have a retracted status and an ejected status. The operation for determining the status information of the smart lock based on the status information of the first component and the second component may include determining that the door is closed and the lock is locked when the thimble is retracted and the latch bolt is ejected, determining that the door is closed and the lock is unlocked when the thimble is retracted and the latch bolt is retracted, or determining that the door is open when the thimble is ejected.

In some embodiments, the thimble (i.e., the detection tongue) may be a detection component on the smart lock, and the detection component may include an association status with a door frame and a disassociation status with the door frame. In some embodiments, when the detection component is in the association status with the door frame, at least a part of the detection component enters inside of the door frame (e.g., a hole or a groove opened on the door frame) or abuts against the door frame. For example, if the detection component is the thimble, when the door is closed, at least a part of the thimble may be inserted into the corresponding hole or groove in the door frame and to be retracted, that is, the detection component is in the association status with the door frame; when the door is open, at least a part of the thimble may be ejected from the hole or the groove, that is, the detection component is in the disassociation status with the door frame. It should be noted that the detection component in the embodiment of the present disclosure is not limited to the structure of the thimble, but may include other structures that can be used to indicate the opening status and closing status of the door. For example, according to different configurations of the door and the smart lock, the detection component may further include a magnet, and the magnet may be adsorbed with another magnetic object provided on the door frame to make the detection component in association status with the door frame, or the detection component may be disassociation status with the door frame by releasing the adsorption.

Without interference from external force, the thimble may be pushed by a spring, and enter the ejected status. When the door is open, the thimble may be in the ejected status. When the door is closed, the thimble may be blocked by the lock structure on a side of a door frame. The status of the thimble may be changed from the ejected status to the retracted status when the door is closed. The thimble may be pushed towards the spring by the side of the door frame, so that the thimble may enter the retracted status. The retracting and ejecting of the latch bolt may be manually controlled by the resident of the house.

Specifically, whether the thimble and the latch bolt are in the retracted status or the ejected status may be determined by setting a micro switch in the smart lock. The status information of the thimble and the latch bolt may also be determined by a device such as a pressure sensor, a distance sensor, etc.

In some embodiments, the smart lock may obtain sensing data, which may be used to monitor the status of the smart lock and the status of the door. In some embodiments, the sensing data may be obtained by one or more sensors. In some embodiments, the sensors may include an acceleration sensor, a speed sensor, a gravity sensor, a temperature sensor, a humidity sensor, a noise sensor, an ultrasonic sensor, an optical sensor, an infrared sensor, a laser sensor, a gyroscope, or the like, or any combination thereof. In some embodiments, the sensing data may include an acceleration of the smart lock, a speed of the smart lock, a gravity of the surrounding environment, a temperature of the surrounding environment, a humidity of the surrounding environment, noise of the surrounding environment, an ultrasonic spectrum image of the surrounding environment, an optical image of surrounding environment, an infrared image of surrounding environment, a point cloud frame of surrounding environment, a direction and an angular velocity of smart lock, or the like, or any combination thereof.

In some embodiments, the first component may be a sensor for capturing the sensing data, and the second component may be a sensor coupled with a bolt or a drive shaft of the smart lock. In some embodiments, the status information of the first component may be status information of the door. The status information of the door may include an opening status and a closing status. In some embodiments, the status information of the second component may be status information of the bolt or the drive shaft. The status information of the smart lock may be determined based to the status information of the door and the status information of the thimble and the latch bolt. In some embodiments, assuming that the smart lock is locked, if the acceleration of the smart lock is greater than a preset acceleration, the orientation change of the smart lock is greater than or equal to a preset orientation change threshold, and/or the angular velocity of the smart lock is greater than or equal to a preset angular velocity threshold, it is determined that the smart lock may have been unlocked. In some embodiments, assuming that the door is closed, in response to the determination that the smart lock is unlocked, it is determined that the door may have been open. In some embodiments, in response to the determination that the smart lock is unlocked and the door is open, it is determined that the door may be in an opening status. In some embodiments, if the acceleration of the smart lock is less than the preset acceleration, the direction change of the smart lock is less than the preset direction change threshold, and the angular velocity of the smart lock is less than the preset angular velocity threshold, it is determined that the smart lock may be in a locked status and the door may be closed. In some embodiments, when the smart lock is unlocked and the door is open, if the acceleration of the smart lock has been reduced to less than the threshold corresponding to the locked status of the door, it is determined that the status of the smart lock may be changed from the unlocked status to the locked status.

In other embodiments, the lock body may not include the latch bolt, and the second component may include the main lock tongue of the lock body. In some embodiments, the main lock tongue may extend or retract from the lock body, and the main lock tongue may include a retracted in-position status and an extended in-position status. In some embodiments, the main lock tongue may be driven by a motor, and the status information of the main lock tongue may be determined by detecting the information of the motor. In some embodiments, when the motor drives the main lock tongue to retract to the first preset position, the main lock tongue is in the retracted in-position status. In some embodiments, whether the main lock tongue is located at the first preset position may be determined by a sensor (e.g., a hall sensor) provided on the motor or a rotation stroke of the motor. For example, the first preset position may be the position of the main lock tongue when the motor drives the main lock tongue to retract to the position where the motor triggers the sensor provided on the motor. As another example, the first preset position may be the position of the main lock tongue when the motor drives the main lock tongue to retract to the preset stroke. In some embodiments, when the motor drives the main lock tongue to extend to the second preset position, the main lock tongue is in the extended in-position status. The second preset position may also be determined by the sensor on the motor or the stroke of the motor. For details, please refer to the method for determining the first preset position, which does not described here. In some embodiments, the smart lock is unlocked when the main lock tongue is in the retracted in-position status. The status information of the smart lock may be determined by further combining the status information of the first component. In some embodiments, when the thimble is retracted and the main lock tongue is in the extended in-position status, the status of the smart lock is determined to be that the door is closed and locked. When the thimble is retracted and the main lock tongue is in the retracted in-position status, the status of the smart lock is determined to be that the door is closed but unlocked. When the thimble is ejected, the status of the smart lock is determined to be that the door is opened.

In some embodiments, the main lock tongue may not be able to reach the retracted in-position status or the extended in-position status due to failure or damage of the lock body. In some embodiments, whether the unlocking or locking is successful may be determined by checking whether the main lock tongue reaches the retracted in-position status or the extended in-position status when the motor stalls. The motor stalls refers to the status when the rotation of the motor is restricted. When the motor stalls, the electric signal (e.g., current or voltage) in the motor increases. In some embodiments, in the process of unlocking, when the motor stalls, the main lock tongue does not reach the first preset position, that is, the motor does not trigger the sensor or does not rotate to complete the preset stroke, then it can be judged that the unlocking fails. When the motor stalls, the main lock tongue has reached the first preset position, that is, the motor has triggered the sensor or has rotated to complete the preset stroke, then it can be judged that the unlocking is successful. In some embodiments, in the locking process, when the motor stalls, the main lock tongue does not reach the second preset position, that is, the motor does not trigger the sensor on the locking side or does not rotate to complete the preset stroke of locking, then it can be judged that the locking fails. When the motor stalls, the main lock tongue has reached the second preset position, that is, the motor has triggered the sensor on the locking side or has rotated to complete the preset stroke of locking, then it can be judged that the locking is successful.

In some embodiments, if the lock body fails to unlock, the smart lock may try to unlock again or more times after a preset time interval (for example, it may be set by the user). In some embodiments, when the number of attempts to unlock exceeds a preset threshold and the lock body is still unlocked, the smart lock may generate an alarm message. In some embodiments, when the smart device is provided with a gateway, the alarm information may be sent to the terminal correlated with the smart lock through the gateway. In some embodiments, when the smart device is not provided with a gateway, the smart device may alarm locally and store the alarm information locally, and send the alarm information to the correlated terminal after there is a data connection between the correlated terminal and the smart device.

In 1330, the server may generate reminder information containing the status information of the smart lock when the status information of the smart lock meets a preset condition.

The reminder information containing the status information of the smart lock may be generated when the status information of the smart lock meets the preset condition. The status information of the smart lock may include, for example, the door opening duration time exceeds 30 minutes, the door is not locked after 22:00, the door is closed and the lock duration exceeds 48 hours, etc.

In 1340, the server may send the reminder information to a terminal having correlating information with the smart lock according to a preset rule.

In some embodiments, the operation for sending the reminder information to a terminal having correlating information with the smart lock according to a preset rule may include sending the reminder information to a terminal having correlating information with the smart lock according to a belonging situation of the house corresponding to the smart lock. The belonging situation may indicate a current using status or a management status of the house. Specifically, the belonging situation of the house corresponding to the smart lock may be determined according to a belonging situation mark of the house corresponding to the smart lock. For example, the house corresponding to the smart lock is a rental house, if the house has been rented out, the belonging situation may be marked as a user, or if the house is not rented out, the belonging situation may be marked as a manager. For example, if the house corresponding to the smart lock is occupied by the homeowner, the belonging situation may be marked as an owner-occupier.

The house corresponding to the smart terminal in this embodiment may include a hotel house, a homestay house, an apartment house, etc. Some of these houses may be used for renting. In response to the abnormal status information of the smart lock, the reminder information may be sent to the tenant (user) or the homeowner (housekeeper/manager) according to an abnormal type and a determination whether the house is rented out. For example, when the house has been rented out and the smart lock is not locked at 11 p.m., the server may generate reminder information and send the reminder information to the tenant who currently lives in the house corresponding to the smart lock instead of the housekeeper. Some of these houses may be owned by the homeowner. In response to the abnormal status information of the smart lock, the reminder information may be sent to the homeowner (owner-occupier) in time.

In some embodiments, if the smart lock is determined to be unlocked, the smart lock may generate an alarm signal indicating that the smart lock is unlocked (or the door is opened) and guide its associated imaging sensors (e.g., an optical sensor, an infrared sensor, an imaging sensor integrated into the smart lock or independent from the smart lock) to obtain images or videos of the smart lock and/or the surrounding environment of the door. The server may obtain the alarm signal from the smart lock and obtain the images of the surrounding environment from the imaging sensor. The server may generate an alarm based on the alarm signal and the images of the surrounding environment to remind the user that the electronic device has been unlocked (or the door has been opened), and push one or more images or videos of the surrounding environment to the user. The user may confirm the real-time image or real-time video of the surrounding environment based on the alarm. In some embodiments, the imaging sensor may also record images of the smart lock and/or the surrounding environment of the door, and associate the recorded images with an event of the smart lock and/or door (e.g., the smart lock is unlocked). When the user needs to view the event of the smart lock and/or door, the server may push the associated images to the user. In some embodiments, for an event of the smart lock and/or door, when multiple images are recorded by the imaging sensor, the server may mark the multiple images based on a current event. In some embodiments, when an image associated with the current event is pushed to the user, the server may perform a deduplication operation on multiple images based on the mark, and only push and display one image to the user.

Figure 14:
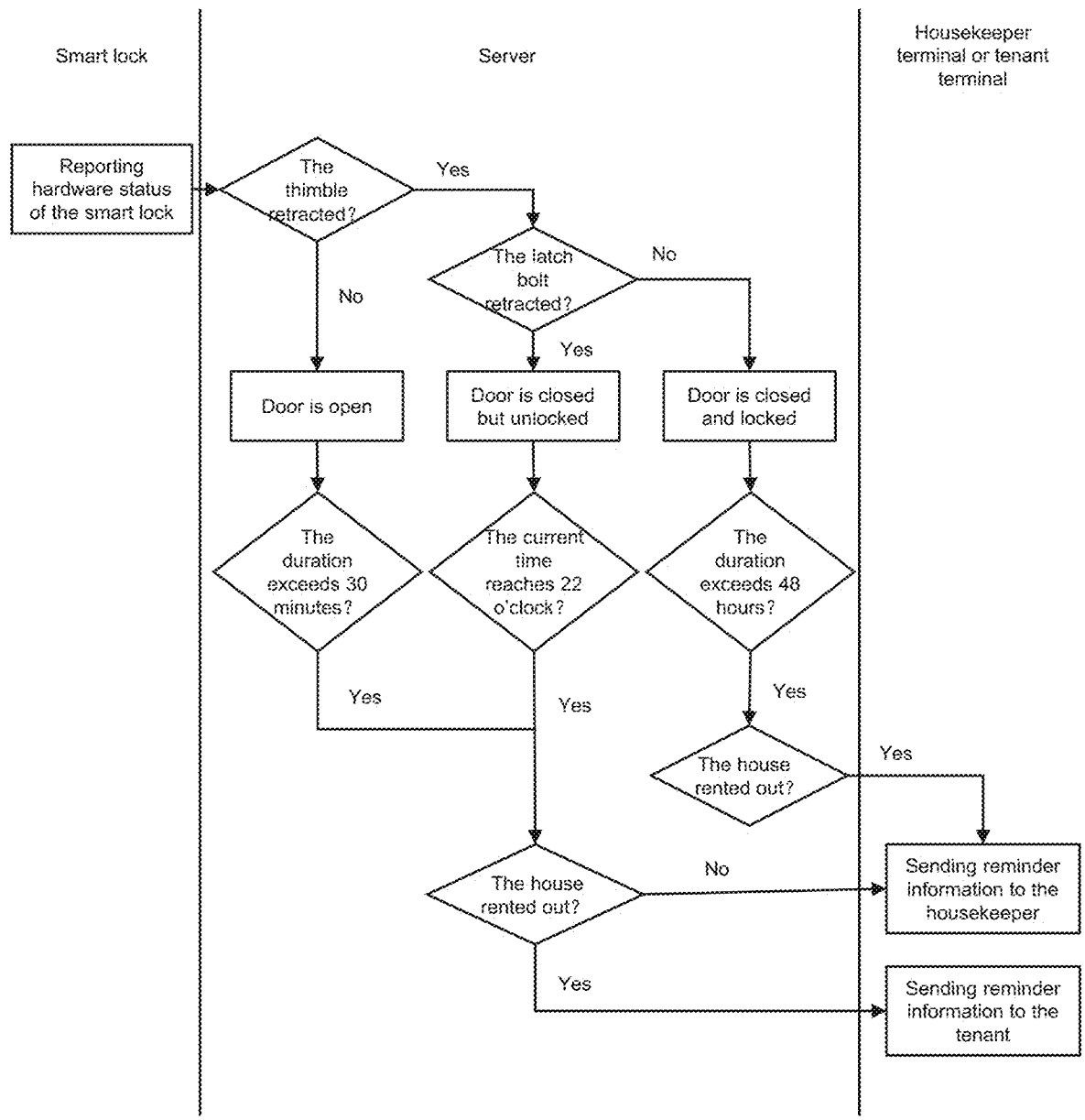
FIG. 14 is a schematic diagram illustrating an exemplary process for reminding status information of a smart lock according to some embodiments of the present disclosure.

FIG. 14 is a schematic diagram illustrating an exemplary process for reminding status information of a smart lock according to some embodiments of the present disclosure.

As shown in FIG. 14, in a specific embodiment, the status information of the smart lock may include three kind of status: the door is open, the door is closed but unlocked, and the door is closed and locked. The operation for generating reminder information containing the status information of the smart lock when the status information of the smart lock meets a preset condition may include generating first reminder information containing the status information when the status information of the smart lock indicates that the door is open and the duration exceeds a first preset duration (taking 30 minutes as an example in FIG. 14), generating second reminder information containing the status information when the status information of the smart lock indicates that the door is closed and unlocked, and the current time reaches a preset time point (taking 22 o'clock as an example in FIG. 14), or generating third reminder information containing the status information when the status information of the smart lock indicates that the door is closed and locked, and the time between the current time and the last time the smart lock was opened reaches a second preset duration (taking 48 hours as an example in FIG. 14).

Based on the above content, the operation for sending the reminder information to a terminal having correlating information with the smart lock according to the preset rule may include determining the belonging situation of the house corresponding to the smart lock after the first reminder information, the second reminder information, or the third reminder information is generated. If the house corresponding to the smart lock belongs to a user, the first reminder information, the second reminder information, or the third reminder information may be sent to a terminal of the user of the house corresponding to the smart lock. As another example, the server may determine the belonging situation of the house corresponding to the smart lock after the first reminder information or the second reminder information is generated. If the house corresponding to the smart lock belongs to a manager, the first reminder information or the second reminder information may be sent to a terminal of the manager of the house corresponding to the smart lock.

In some embodiments, when the house is rented out, if the tenant has not opened the door for a long time, it is necessary to determine whether the tenant has a safety problem. In this case, the reminder information may be pushed to the housekeeper, so that the housekeeper may check the safety situation in the apartment and find the problem in time. In addition, when the house is rented out, if the door is opened for more than 30 minutes or the door is unlatched and unlocked (i.e., the door is closed and unlocked) late at night, it is necessary to send reminder information to the tenant to remind him to close or lock the door in time to avoid possible danger and property loss. When the house is not rented out, if the door is opened for more than 30 minutes or the door is unlatched and unlocked (i.e., the door is closed and unlocked) late at night, it is necessary to send reminder information to the housekeeper to remind him to close or lock the door in time to avoid property loss.

In this embodiment, according to the method for reminding status information of a smart lock, the status information of the smart lock may be determined based on the status information of the first component and the second component of the smart lock. There is no need to retrofit and install the door magnetic device on the lock, which has a low cost. In addition, a dangerous status may be determined according to preset rules, and reminder information may be sent to the user terminal in time to avoid potential safety hazards.

In some embodiments, after detecting the status information of the smart lock, the smart lock may also perform corresponding operations according to the status information. In some embodiments, when the smart lock is in a status where the door is closed but unlocked, the smart lock may control the lock body to automatically lock. In some embodiments, the user may set the corresponding automatic locking time for the smart lock. When the door is closed to the automatic locking time set by the user, the smart lock can automatically lock. In some embodiments, the smart lock may also automatically lock immediately when the door is closed.

In some embodiments, the smart lock may also perform corresponding operations only according to the status information of the lock body. In some embodiments, the status information of the lock body may include a locked status and an unlocked status. When the smart lock detects that the lock body is in the unlocked status, the smart lock can control the lock body to lock automatically according to the set automatic locking time.

Figure 15:
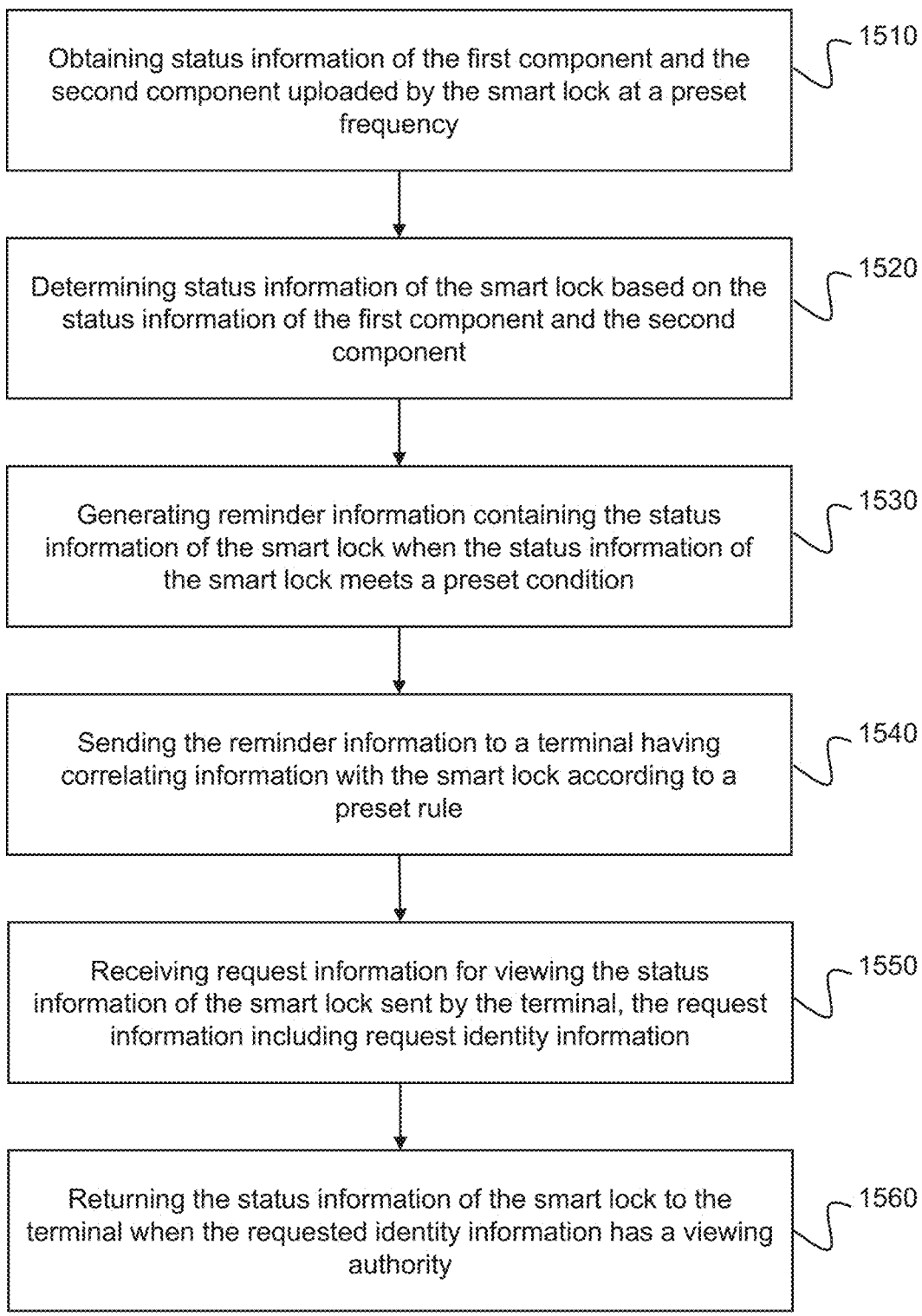
FIG. 15 a flowchart illustrating another exemplary process for reminding status information of a smart lock according to some embodiments of the present disclosure.

FIG. 15 is a flowchart illustrating another exemplary process for reminding status information of a smart lock according to some embodiments of the present disclosure. As shown in FIG. 15, the method for reminding status information of the smart lock may include the following operations.

In 1510, status information of the first component and the second component uploaded by the smart lock at a preset frequency may be obtained.

The status information of the first component may indicate an opening status or a closing status of the door, and the status information of the second component may indicate a locking status of the lock.

In 1520, status information of the smart lock may be determined based on the status information of the first component and the second component.

In 1530, reminder information containing the status information of the smart lock may be generated when the status information of the smart lock meets a preset condition.

In 1540, the reminder information may be sent to a terminal having correlating information with the smart lock according to a preset rule.

In 1550, request information for viewing the status information of the smart lock sent by the terminal may be received. The request information may include request identity information.

The request information for viewing the status information of the smart lock may be sent through an APP with related functions on the terminal. The terminal may be a terminal of a housekeeper or a homeowner, or a terminal of a tenant.

The request identity information may be personal information, such as a name, an ID number, a phone number, or the like, of a tenant registered when the tenant checked into the house corresponding to the smart lock. The request identity information may also be information, such as a name, an ID number, a phone number, or the like, of a housekeeper or a homeowner who has the right to manage and own the house corresponding to the smart lock.

In 1560, the status information of the smart lock may be returned to the terminal when the requested identity information has a viewing authority.

If it is determined that the requested identity information is the information corresponding to the tenant or the housekeeper, the server may determine the terminal sending the requested information as an authorized terminal, which has the authority to view the status information of the smart lock corresponding to the requested identity information. In response to the request information, the server may send the status information of the smart lock to the terminal sending the request information.

In this embodiment, according to the method for reminding status information of a smart lock, an authorized person may be allowed to apply to view the status information of the smart lock at any time. The status information of the smart lock may be determined based on the status information of the first component and the second component of the smart lock. There is no need to retrofit and install the door magnetic device on the lock, thus having a low cost. In addition, the dangerous status may be determined according to preset rules, and reminder information may be sent to the user terminal in time to avoid potential safety hazards.

In the embodiments described above, for the sake of simple description, the embodiments are expressed as a series of operation combinations. The operations described in the present disclosure may not be limited by the described sequence. According to the present disclosure, some operations may be performed in other sequences or simultaneously. In addition, for a person of ordinary skills in the art, the embodiments described in the present disclosure are preferred embodiments, and the involved actions and modules may not be necessarily required in the present disclosure.

Figure 16:
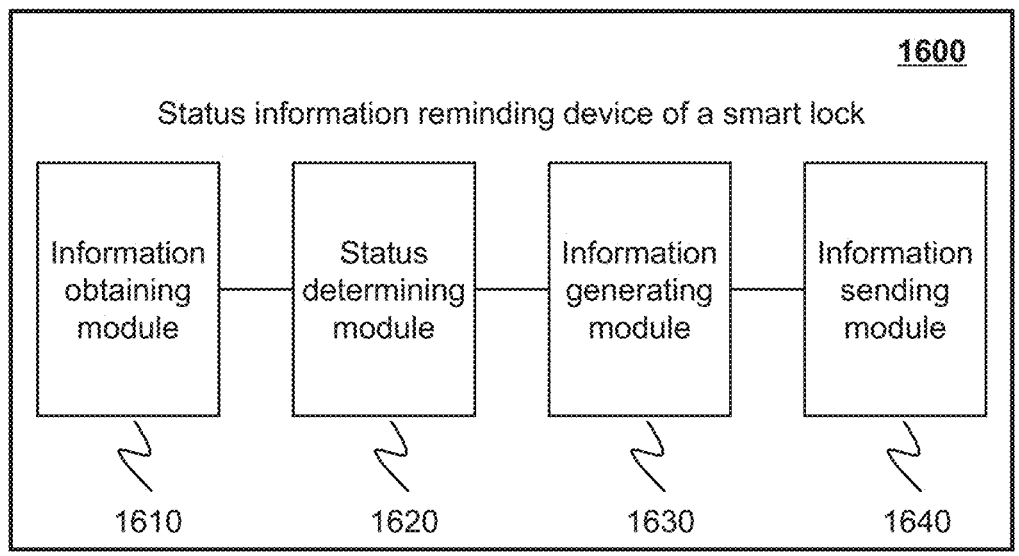
FIG. 16 is a block diagram illustrating an exemplary status information reminding device of a smart lock according to some embodiments of the present disclosure.

FIG. 16 is a block diagram illustrating an exemplary status information reminding device of a smart lock according to some embodiments of the present disclosure. As shown in FIG. 16, the status information reminding device 1600 of a smart lock may include one or more of the following modules.

An information obtaining module 1610 may be configured to obtain status information of a first component of the smart lock and status information of a second component of the smart lock.

The status information of the first component may be used to indicate an opening status or a closing status of the door, and the status information of the second component may be used to indicate a locking status of the lock.

The status information of the first component and the second component of the smart lock may be acquired by the server actively, or uploaded to the server by the smart lock according to a preset rule.

Specifically, the information obtaining module 1610 may have different implementations. For example, the information obtaining module 1610 may be specifically configured to receive the status information of the first component and the second component uploaded by the smart lock in a preset frequency, or send an obtaining request for the status information to the smart lock and receive the status information of the first component and the second component sent by the smart lock according to the obtaining request.

In other embodiments, the information obtaining module 1610 may be specifically configured to receive the status information of the first component and the second component which is uploaded by the smart lock when a status of the smart lock changes.

A status determining module 1620 may be configured to determine status information of the smart lock based on the status information of the first component and the second component.

In some embodiments, the first component may be a thimble. The thimble may have a retracted status and an ejected status. The second component may be a latch bolt.

The latch bolt may have a retracted status and an ejected status. The status determining module 1620 may determine that the door is closed and the lock is locked when the thimble is retracted and the latch bolt is ejected, determine that the door is closed and the lock is unlocked when the thimble is retracted and the latch bolt is retracted, or determine that the door is open when the thimble is ejected.

The thimble may be pushed by a spring, and enter the ejected status. When the door is open, the thimble may be in the ejected status. When the door is closed, the thimble may be blocked by the lock structure on a side of a door frame. The status of the thimble may be changed from the ejected status to the retracted status when the door is closed. The thimble may be pushed towards the spring by the side of the door frame, so that the thimble may enter the retracted status. The retracting and ejecting of the latch bolt may be manually controlled by the resident of the house.

Specifically, whether the thimble and the latch bolt are in the retracted status or the ejected status may be determined by setting a micro switch in the smart lock. The status information of the thimble and the latch bolt may also be determined by a device such as a pressure sensor, a distance sensor, etc.

An information generating module 1630 may be configured to generate reminder information containing the status information of the smart lock when the status information of the smart lock meets a preset condition.

The reminder information containing the status information of the smart lock may be generated when the status information of the smart lock meets the preset condition. The status information of the smart lock may include, for example, the door opening duration time exceeds 30 minutes, the door is not locked after 22:00, the door is closed and the lock duration exceeds 48 hours, etc.

An information sending module 1640 may be configured to send the reminder information to a terminal having correlating information with the smart lock according to a preset rule.

In some embodiments, the information sending module 1640 may be specifically configured to send the reminder information to a terminal having correlating information with the smart lock according to a belonging situation of the house corresponding to the smart lock. The belonging situation may indicate a current using status or a management status of the house. Specifically, the belonging situation of the house corresponding to the smart lock may be determined according to a belonging situation mark of the house corresponding to the smart lock. For example, the house corresponding to the smart lock is a rental house, if the house has been rented out, the belonging situation may be marked as a user, or if the house is not rented out, the belonging situation may be marked as a manager. For example, if the house corresponding to the smart lock is occupied by the homeowner, the belonging situation may be marked as an owner-occupier.

The house corresponding to the smart terminal in this embodiment may include a hotel house, a homestay house, an apartment house, etc. Some of these houses may be used for renting. In response to the abnormal status information of the smart lock, the reminder information may be sent to the tenant (user) or the homeowner (housekeeper/manager) according to an abnormal type and a determination whether the house is rented out. For example, when the house has been rented out and the smart lock is not locked at 11 p.m., the server may generate reminder information and send the reminder information to the tenant who currently lives in the house corresponding to the smart lock instead of the housekeeper.

In a specific embodiment, the status information of the smart lock may include three kind of status: the door is open, the door is closed but unlocked, and the door is closed and locked. The information generating module 1630 may be specifically configured to generate first reminder information containing the status information when the status information of the smart lock indicates that the door is open and the duration exceeds a first preset duration, generate second reminder information containing the status information when the status information of the smart lock indicates that the door is closed and unlocked, and the current time reaches a preset time point, or generate third reminder information containing the status information when the status information of the smart lock indicates that the door is closed and locked, and the time between the current time and the last time the smart lock was opened reaches a second preset duration.

Based on the above content, the information sending module 1640 may be specifically configured to determine the belonging situation of the house corresponding to the smart lock after the first reminder information, the second reminder information, or the third reminder information is generated. If the house corresponding to the smart lock belongs to a user, the first reminder information, the second reminder information, or the third reminder information may be sent to a terminal of the user of the house corresponding to the smart lock. Alternatively, the information sending module 1640 may be specifically configured to determine the belonging situation of the house corresponding to the smart lock after the first reminder information or the second reminder information is generated. If the house corresponding to the smart lock belongs to a manager, the first reminder information or the second reminder information may be sent to a terminal of the manager of the house corresponding to the smart lock.

Figure 17:
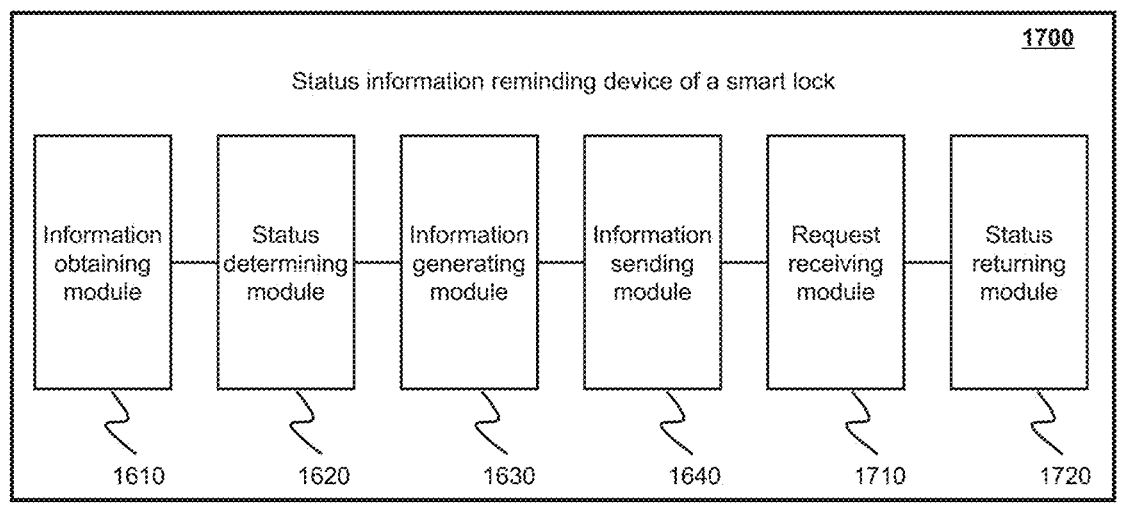
FIG. 17 is a block diagram illustrating an exemplary status information reminding device of a smart lock according to some embodiments of the present disclosure.

FIG. 17 is a block diagram illustrating an exemplary status information reminding device of a smart lock according to some embodiments of the present disclosure. As shown in FIG. 17, the status information reminding device 1700 of a smart lock may include one or more of the following modules.

An information obtaining module 1610 may be configured to obtain status information of a first component of the smart lock and status information of a second component of the smart lock.

The status information of the first component may be used to indicate an opening status or a closing status of the door, and the status information of the second component may be used to indicate a locking status of the lock.

A status determining module 1620 may be configured to determine status information of the smart lock based on the status information of the first component and the second component.

An information generating module 1630 may be configured to generate reminder information containing the status information of the smart lock when the status information of the smart lock meets a preset condition.

An information sending module 1640 may be configured to send the reminder information to a terminal having correlating information with the smart lock according to a preset rule.

A request receiving module 1710 may be configured to receive request information for viewing the status information of the smart lock sent by the terminal. The request information may include request identity information.

The request information for viewing the status information of the smart lock may be sent through an APP with related functions on the terminal. The terminal may be a terminal of a housekeeper or a homeowner, or a terminal of a tenant.

The request identity information may be personal information, such as a name, an ID number, a phone number, or the like, of a tenant registered when the tenant checked into the house corresponding to the smart lock. The request identity information may also be information, such as a name, an ID number, a phone number, or the like, of a housekeeper or a homeowner who has the right to manage and own the house corresponding to the smart lock.

A status returning module 1720 may be configured to return the status information of the smart lock to the terminal when the requested identity information has a viewing authority.

If it is determined that the requested identity information is the information corresponding to the tenant or the housekeeper, the server may determine the terminal sending the requested information as an authorized terminal, which has the authority to view the status information of the smart lock corresponding to the requested identity information. In response to the request information, the server may send the status information of the smart lock to the terminal sending the request information.

In this embodiment, according to the method for reminding status information of a smart lock, an authorized person may be allowed to apply to view the status information of the smart lock at any time. The status information of the smart lock may be determined based on the status information of the first component and the second component of the smart lock. There is no need to retrofit and install the door magnetic device on the lock, thus having a low cost. In addition, the dangerous status may be determined according to preset rules, and reminder information may be sent to the user terminal in time to avoid potential safety hazards.

Any one of the status information reminding devices of the smart lock described in the above embodiment may include a processor and a memory. The information obtaining module, the status determining module, the information generating module, the information sending module, the request receiving module, and the status returning module described above may all be stored in the memory as a program module, and be executed by the processor to perform the corresponding function.

The processor may include one or more kernels. The one or more kernels may be configured to retrieve corresponding program modules from the memory and process the data for reminding status information of a smart lock by adjusting parameters of the one or more kernels.

The memory may include a non-permanent memory in computer readable media, a random access memory (RAM) and/or a non-volatile memory, such as a read-only memory (ROM) or a flash memory (flash RAM). The memory may include at least one memory chip.

An embodiment of the present disclosure provides a storage medium on which a program is stored. When the program is executed by a processor, the method for reminding status information of a smart lock described above is performed.

An embodiment of the present disclosure provides a processor. The processor may be configured to execute a program. When the program is executed, the method for reminding status information of a smart lock described above is performed.

Further, an embodiment of the present disclosure provides an electronic device including a processor and a memory. The memory may be configured to store executable instructions of the processor. The processor may be configured to perform the status reminding method of the smart lock described above by executing the executable instructions.

Some embodiments of the present disclosure provide a method and device for controlling a smart lock. The server 110 may obtain communication information of the smart lock through the network 120 and determine the communication status information of the smart lock. The communication status information may include information about whether the smart lock is online or offline. When the smart lock is online, the server may generate an online password and send the online password to the smart lock, the user terminal 140, and the lock controller. The user may unlock the smart lock using the online password. When the smart lock is offline, the server may generate an activation code and send the activation code to the user terminal 140 and the lock controller. The lock controller may obtain the activation code according to the user's input operation, and obtain the offline password by resolving the activation code. Therefore, the lock controller may obtain the password issued by the server when the lock is offline.

Figure 18:
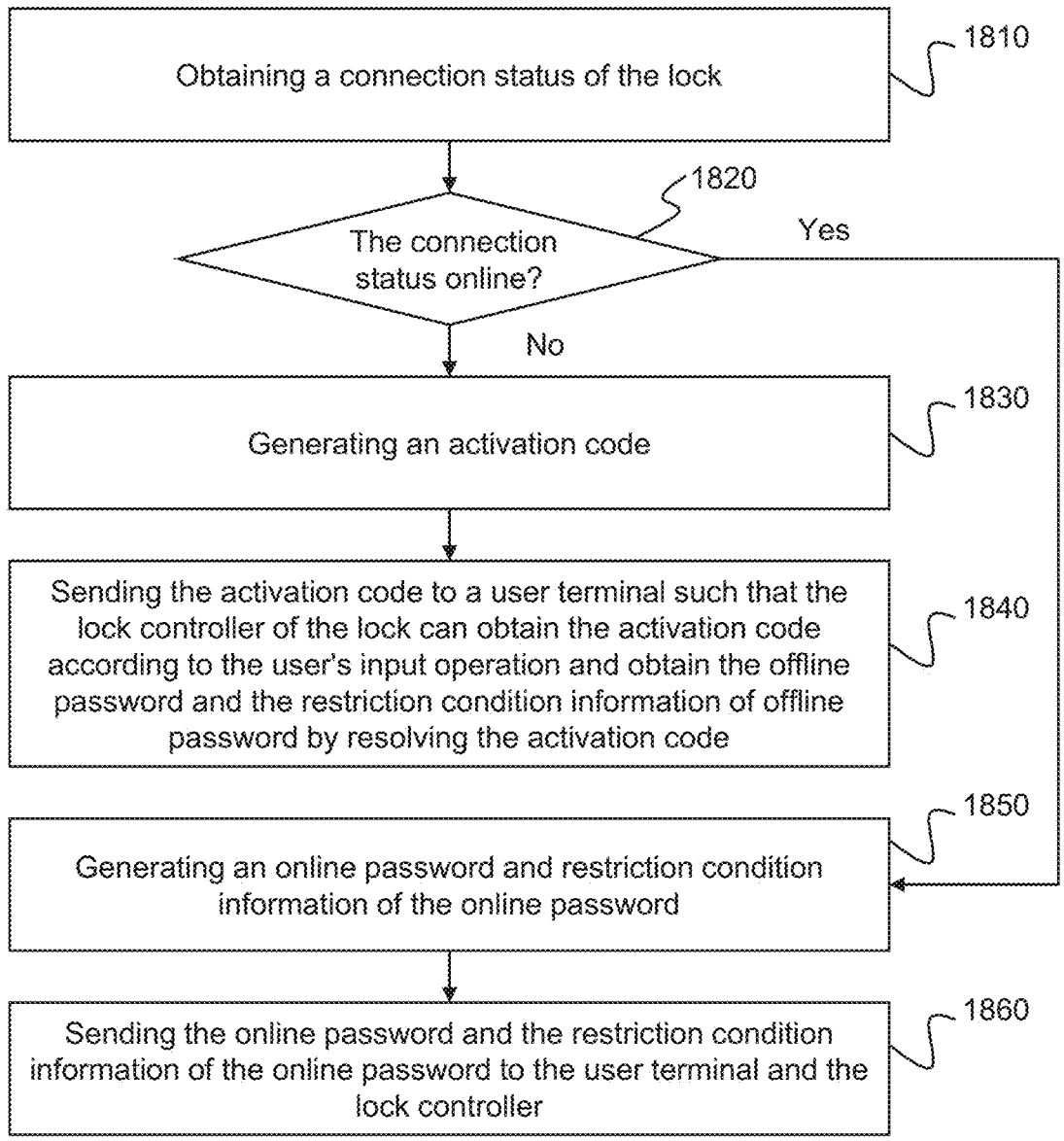
FIG. 18 is a flowchart illustrating an exemplary process for controlling a lock according to some embodiments of the present disclosure.

FIG. 18 is a flowchart illustrating an exemplary process for controlling a lock according to some embodiments of the present disclosure. The process may be performed by a server. The server may be a cloud server. Referring to FIG. 18, the process may include the following operations.

In 1810, a connection status of the lock may be obtained. The connection status may include an online status and an offline status. The connection status of the lock may be determined as the following two ways.

In a first way, the lock may report the connection status at an interval of a first designated time period. If the connection status of the lock is not received within a second designated time period from the latest receiving of the connection status reported by the lock, the lock may be determined as offline. The second designated time period may be greater than the first designated time period.

If the connection status reported by the lock is received every first designated time period, the lock may be determined as online.

In the second way, the server may send a lock status obtaining instruction to the lock controller. If the connection status feedback from the lock controller is received within a third designated time period, the lock may be determined as online. If the connection status feedback from the lock controller is not received within the third designated time period, the lock may be determined as offline.

In 1820, a determination as to whether the connection status is online may be made. In response to a determination that the connection status is online, an online password and restriction condition information of the online password may be generated by performing operation 1850. In response to a determination that the connection status is offline, an activation code may be generated by performing operation 1830.

It should be noted that when the lock is offline, the lock controller may not directly communicate with the server, and the server may not directly issue the password to the lock controller. The determination as to whether the lock is online needs to be made by performing operation 1820.

In 1830, an activation code may be generated.

The activation code may include an offline password and restriction condition information of the offline password.

Specifically, the server may generate the offline password in a random manner. The restriction condition information of the offline password may be personalized according to different users. The restriction condition information may be selected by a homeowner. The homeowner may select the restriction condition information by inputting in a text box. The homeowner may include a manager of a rental house. In some embodiments, the owner-occupier lives in the house. Correspondingly, the homeowner may also include the owner-occupier of the house.

The restriction condition information of offline passwords may include:
(1) A count of times that the passwords are allowed to be input by a user (unlimited, once, twice, etc.);
(2) Effective time period (permanent, year× month× day× ~ year× month× day×);
(3) Effective period (every day, every Monday/Tuesday/ etc., day×~ day× every month);
(4) Effective time (all day, × O'clock~× O'clock);
(5) Whether the password is frozen.

All time or time periods may be customized for choosing. The above five restrictions may cover all scenarios that the users use the password. Further, operating on the user terminal may be simple and convenient, which provides better user experiences.

For example, the restriction condition information for a cleaning staff may be that the count of times that the passwords are allowed to be input by a user is unlimited, the effective time period is selected as from Apr. 5, 2018 to Apr. 5, 2019 or permanent, the effective period is selected as every Wednesday, the effective time is selected as 16:00~17:00, and the password is not frozen.

As another example, the restriction condition information for a potential tenant or deliveryman may be that the count of times that the passwords are allowed to be input by a user is selected as once, the effective time period is selected as from Apr. 5, 2018 to Apr. 5, 2018, the effective period is selected as every day, the effective time is selected as 16:00~17:00, and the password is not frozen.

As still another example, the restriction condition information for a manager may be that the count of times that the passwords are allowed to be input by a user is unlimited, the effective time period is permanent, the effective period is every day, the effective time is all day, and the password is not frozen.

It should be noted that the server may generate the activation code by using an activation code generating method engaged with the lock controller. In some embodiments, one or more specific values may be used to represent the count of times that the passwords are allowed to be input by a user, the effective time period, the effective period, the effective time, and whether the password is frozen. For example, 1 may indicate that the password is frozen, and 2 may indicate that the password is not frozen.

In 1840, the activation code may be sent to the user terminal 140. The lock controller of the lock may obtain the activation code according to the user's input operation and obtain the offline password and the restriction condition information of offline password by resolving the activation code.

Specifically, the server may generate the activation code and send the activation code to the user terminal. The user of the user terminal or a user authorized by the user of the user terminal may input the activation code in the password input device of the lock. The lock controller of the lock may obtain the activation code and obtain the offline password and the restriction condition information of offline password by resolving the activation code. The password issued by the server may still be obtained when the lock is offline.

In 1850, an online password and restriction condition information of the online password may be generated.

Specifically, the online password may be generated in a random manner. Since the lock is online, the online password may be directly issued to the lock controller and the user of the user terminal 140.

The generating process of restriction condition information of the online password may be similar to that of the offline password. The generating process may be found in the corresponding descriptions above and will not be repeated here.

In 1860, the online password and the restriction condition information of the online password may be sent to the user terminal and the lock controller.

After the online password and the restriction condition information of the online password are sent to the user terminal and the lock controller, the user may determine his own unlocking time according to the restriction condition information of the online password. The user may further unlock the lock at a proper time.

In addition, the lock controller may also determine whether the password entered by the user is correct or whether it is a right unlocking time according to the online password and the restriction condition information of the online password.

In this embodiment, when the lock is offline, the server may generate an activation code and send the activation code to the user terminal. The lock controller may obtain the activation code according to the user's input operation, and obtain the offline password and the restriction condition information of offline password by resolving the activation code. Therefore, the lock controller may obtain the password issued by the server when the lock is offline.

Optionally, the server may perform the following operations before the operation 1810 is performed.
1) The server may obtain the password type of a password to be applied input by a preset user.

Specifically, the server may read the identity information of a tenant (i.e., a user) input by a merchant. The identity information may include a phone number, an ID number, or other information. Then the merchant may select the password type.
2) If the password type is a clear code, the server may generate a clear code and restriction condition information of the clear code.

The clear code may be configured to set the valid status of the online password, the valid status of the offline password, and the valid status of the clear code as invalid values. The clear code may be generated in a random manner. The restriction condition information of the clear code may be the effective time period of the clear code, such as permanent, a designated time period, etc.
3) The server may send the clear code and the restriction condition information of the clear code to the user terminal.

Specifically, after the clear code is sent to the user terminal, when the user wants to clear the online password, the offline password, and the clear code of the lock stored in the lock controller, the user may input the clear code in the password input device of the lock.
4) If the password type is an unlocking password, the server may perform the operation of obtaining the connection status of the lock.

In this embodiment, the server may generate a clear code, an offline password, or an online password according to the settings of the merchant, and issue the clear code, the online password, or the offline password according to different scenarios.

In some embodiments, the server may also generate a functional code according to the settings of the merchant. The functional code may be a predetermined code set by the manager of the smart device 130 (e.g., the merchant). An unauthorized user (e.g., a temporary visitor) may access the smart device 130 (e.g., access and operate the smart lock) by inputting the functional code. In some embodiments, the server may issue the clear code, the functional code, the online password, or the offline password according to different scenarios.

Figure 19:
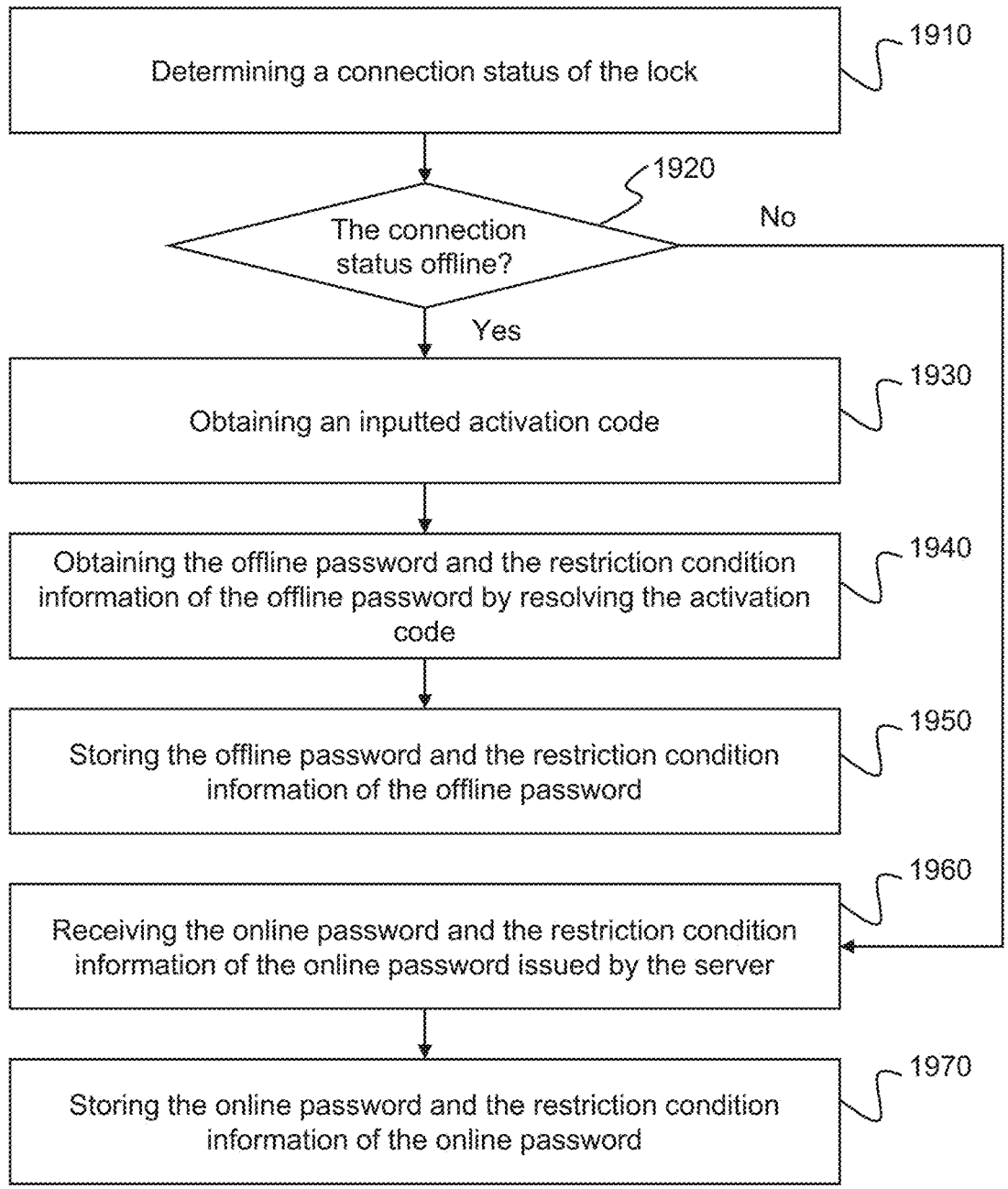
FIG. 19 is a flowchart illustrating another exemplary process for controlling a lock according to some embodiments of the present disclosure.

FIG. 19 is a flowchart illustrating another exemplary process for controlling a lock according to some embodiments of the present disclosure. The process may be performed by a lock controller.

In 1910, a connection status of the lock may be determined.

Specifically, the lock controller may determine whether the lock is online or offline based on whether the lock can communicate with the server.

In 1920, a determination as to whether the connection status is offline may be made. In response to a determination that the connection status is offline, an inputted activation code may be obtained by performing operation 1930. In response to a determination that the connection status is online, an online password and restriction condition information of the online password issued by the server may be received by performing operation 1960.

In 1930, the inputted activation code may be obtained.

The activation code may include an offline password and restriction condition information of the offline password.

After the activation code issued by the server is received by the user terminal, the user of the user terminal may input the activation code in the password inputting device of the lock, and the lock controller may obtain the activation code.

In 1940, the activation code may be resolved. The offline password and the restriction condition information of the offline password in the activation code may be obtained.

Since an activation code generating method is engaged by the lock controller and the server, the lock controller may obtain the offline password and the restriction condition information of offline password by resolving the activation code according to the activation code generating method.

In 1950, the offline password and the restriction condition information of the offline password may be stored.

Specifically, after the offline password and the restriction condition information of the offline password is stored, when the user input the offline password, a determination as to whether the unlocking condition is met may be made according to the restriction condition information of the offline password. If the unlocking condition is met, the lock may be unlocked.

In 1960, the online password and the restriction condition information of the online password issued by the server may be received.

In 1970, the online password and the restriction condition information of the online password may be stored.

Specifically, when the lock is online, the online password and the restriction condition information of the online password issued by the server may be directly received.

It should be noted that an operation for storing the offline password and the restriction condition information of the offline password, or an operation for storing the online password and the restriction condition information of the online password may be recorded as an operation record. The operation record may be uploaded to the server to be stored.

In this embodiment, regardless of whether the lock is online or offline, the password issued by the server may be normally received by the lock, thereby making the way of issuing the password more flexible.

Figure 20:
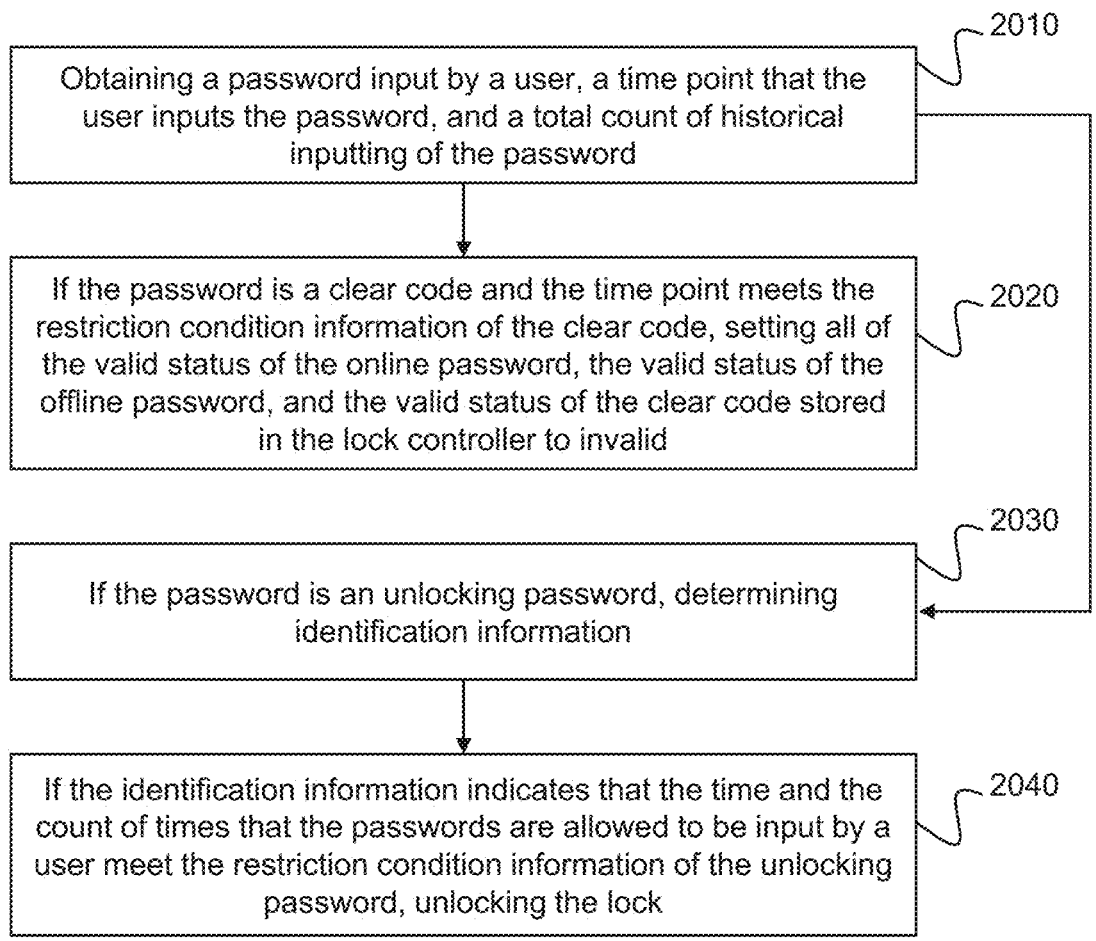
FIG. 20 is a flowchart illustrating another exemplary process for controlling a lock according to some embodiments of the present disclosure.

FIG. 20 is a flowchart illustrating another exemplary process for controlling a lock according to some embodiments of the present disclosure.

In 2010, a password input by a user, a time point that the user inputs the password, and a total count of historical inputting of the password may be obtained.

The password input by the user may be obtained from the password inputting device. The time point that the user inputs the password may be obtained from the clock module. The total count of historical inputting of the password may be determined in combination with the historical inputting of the password.

In 2020, if the password is a clear code and the time point meets the restriction condition information of the clear code, all of the valid status of the online password, the valid status of the offline password, and the valid status of the clear code stored in the lock controller may be set to invalid.

An identity (ID) of the clear code may be different from that of the unlocking password. For example, the ID of the clear code may range from 1 to 100, and the ID of the unlocking password ID may range from 100 to 200.

Since the effective time period of the clear code is limited by the restriction condition information of the clear code, it is necessary to determine whether the time point that the user inputs the password is within the effective time period. For example, assuming that the effective time period may be 20180620-20180820, if the time point that the user inputs the password is 20180621, it may be determined that the time point that the user inputs the password is within the effective time period, that is, the time point that the user inputs the password meets the restriction condition information of the clear code.

If the time point that the user inputs the password is 20180521, it may be determined that the time point that the user inputs the password is not within the effective time period, and the time point that the user inputs the password does not meet the restriction condition information of the clear code.

In 2030, if the password is an unlocking password, identification information may be determined. The unlocking password may include an online password and an offline password. The identification information may indicate whether the time and the count of times that the passwords are allowed to be input by a user meet the restriction condition information of the unlocking password.

Both the online password and the offline password may belong to the unlocking password. The unlocking password may be a password for unlocking the lock.

The count of times that the passwords are allowed to be input by a user, the effective time period, the effective period, the effective time, and whether the password is frozen are limited by the restriction condition information of the unlocking password. If the time point that the user inputs the password meets the effective time period, the effective period, and the effective time, the count of inputting the password meets the count of times that the passwords are allowed to be input by a user, and the password is not frozen, a first identifier indicates that the time and the count of times that the passwords are allowed to be input by a user meet the restriction condition information of the unlocking password may be determined as the identification information.

If the time point that the user inputs the password does not meet any one of the effective time period, the effective period, and the effective time, the count of inputting the password does not meet the count of times that the passwords are allowed to be input by a user, or the password is frozen, a second identifier indicates that the time and the count of times that the passwords are allowed to be input by a user do not meet the restriction condition information of the unlocking password may be determined as the identification information.

In 2040, if the identification information indicates that the time and the count of times that the passwords are allowed to be input by a user meet the restriction condition information of the unlocking password, the lock may be unlocked.

If the identification information indicates that the time and the count of times that the passwords are allowed to be input by a user meet the restriction condition information of the unlocking password, it may be determined that the current operation for unlocking the lock is legal, and the lock may be unlocked.

In addition, after the lock is unlocked, the lock controller may upload the unlocking record to the server to be stored. The unlocking record may include an unlocking time, a password input by the user, etc.

In this embodiment, the lock controller may perform a series of verifications when the user inputs the password. The lock may only be unlocked after the series of verifications are passed, thereby improving the safety.

Figure 21:
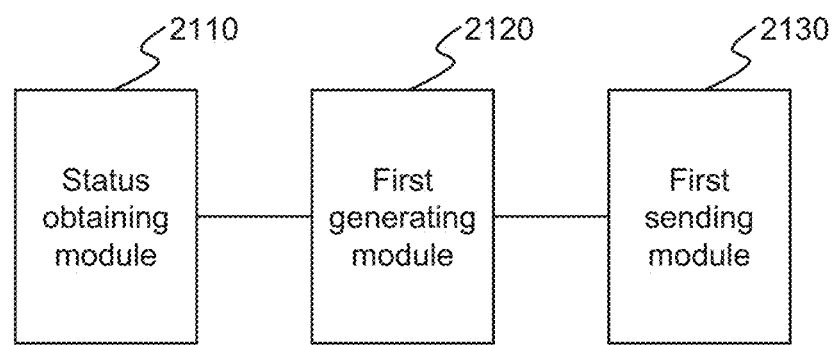
FIG. 21 is a block diagram illustrating an exemplary lock controlling device according to some embodiments of the present disclosure.

FIG. 21 is a block diagram illustrating an exemplary lock controlling device according to some embodiments of the present disclosure. The lock controlling device may be applied to a server. As shown in FIG. 21, the lock controlling device may include a status obtaining module 2110, a first generating module 2120, and a first sending module 2130.

The status obtaining module 2110 may be configured to obtain a connection status of the lock.

The first generating module 2120 may be configured to generate an activation code if the connection status is offline. The activation code may include an offline password and restriction condition information of the offline password.

The first sending module 2130 may be configured to send the activation code to a user terminal. The lock controller of the lock may obtain the activation code according to the user's input operation and obtain the offline password and the restriction condition information of offline password by resolving the activation code.

The lock controlling device may further include a second generating module and a second sending module.

The second generating module may be configured to generate an online password and restriction condition information of the online password if the connection status is online.

The second sending module may be configured to send the online password and the restriction condition information of the online password to the user terminal and the lock controller.

In this embodiment, when the lock is offline, the server may generate an activation code and send the activation code to the user terminal. The lock controller may obtain the activation code according to the user's input operation, and obtain the offline password and the restriction condition information of offline password by resolving the activation code. Therefore, the lock controller may obtain the password issued by the server when the lock is offline.

It should be noted that, the working process of each module in this embodiment may be found in the corresponding description above and will not be repeated here.

Optionally, the lock controlling device may further include a type obtaining module, a third generating module, and a third sending module.

The type obtaining module may be configured to obtain the password type of a password to be applied input by a preset user.

The third generating module may be configured to generate a clear code and restriction condition information of the clear code if the password type is a clear code.

The third sending module may be configured to send the clear code and the restriction condition information of the clear code to the user terminal.

The type obtaining module may also be configured to obtain a connection status of the lock if the password type is an unlocking password.

In this embodiment, the server may generate a clear code, an offline password, or an online password according to the settings of the merchant, and issue the clear code, the online password, or the offline password according to different scenarios.

It should be noted that, the working process of each module in this embodiment may be found in the corresponding description above and will not be repeated here.

Figure 22:
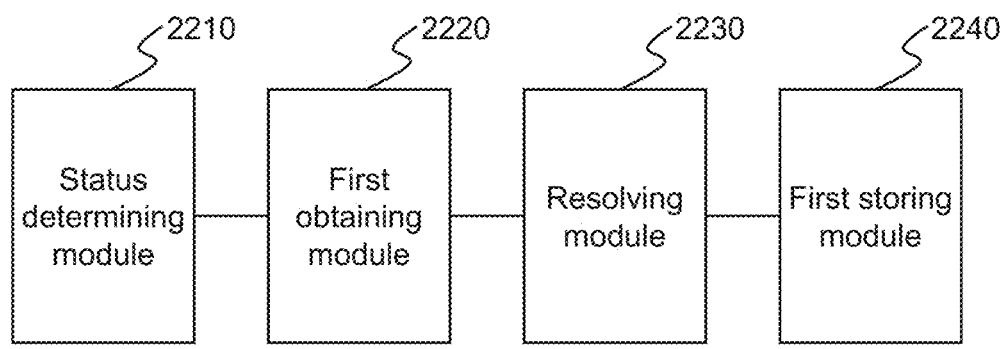
FIG. 22 is a block diagram illustrating an exemplary lock controlling device according to some embodiments of the present disclosure.

FIG. 22 is a block diagram illustrating an exemplary lock controlling device according to some embodiments of the present disclosure. The lock controlling device may be applied to a lock controller. As shown in FIG. 22, the lock controlling device may include a status determining module 2210, a first obtaining module 2220, a resolving module 2230, and a first storing module 2240. The status determining module 2210 may be configured to determine a connection status of the lock.

The first obtaining module 2220 may be configured to obtain an inputted activation code if the connection status is offline. The activation code may include an offline password and restriction condition information of the offline password.

The resolving module 2230 may be configured to obtain the offline password and the restriction condition information of offline password by resolving the activation code. The first storing module 2240 may be configured to store the offline password and the restriction condition information of the offline password.

The lock controlling device may further include a receiving module and a second storing module. The receiving module may be configured to receive the online password and the restriction condition information of the online password issued by the server. The second storing module may be configured to store the online password and the restriction condition information of the online password.

In this embodiment, regardless of whether the lock is online or offline, the password issued by the server may be normally received by the lock, thereby making the way of issuing the password more flexible.

It should be noted that, the working process of each module in this embodiment may be found in the corresponding description above and will not be repeated here.

Optionally, the lock controlling device may further include a second obtaining module, a status setting module, an information determining module, and an unlocking controlling module. The second obtaining module may be configured to obtain a password input by the user, a time point that the user inputs the password, and a total count of historical inputting of the password. The status setting module may be configured to set all of the valid status of the online password, the valid status of the offline password, and the valid status of the clear code stored in the lock controller to invalid if the password is a clear code and the time point meets the restriction condition information of the clear code. The information determining module may be configured to determine identification information if the password is an unlocking password. The unlocking password may include an online password and an offline password. The identification information may indicate whether the time and the count of times that the passwords are allowed to be input by a user meet the restriction condition information of the unlocking password. The unlocking controlling module may be configured to unlock the lock if the identification information indicates that the time and the count of times that the passwords are allowed to be input by a user meet the restriction condition information of the unlocking password.

In this embodiment, the lock controller may perform a series of verifications when the user inputs the password. The lock may only be unlocked after the series of verifications are passed, thereby improving the safety.

It should be noted that, the working process of each module in this embodiment may be found in the corresponding description above and will not be repeated here.

Optionally, an embodiment of the present disclosure provides a lock controlling device applied to a server. The lock controlling device applied to the server may include a processor and a memory. The status obtaining module, the first generating module, and the first sending module may all be stored in the memory as a program module, and be executed by the processor to perform the corresponding function.

The processor may include one or more kernels. The one or more kernels may be configured to retrieve corresponding program module from the memory. The lock controller may obtain the password issued by the server when the lock is offline by adjusting parameters of the one or more kernels.

The memory may include a non-permanent memory in computer readable media, a random access memory (RAM) and/or a non-volatile memory, such as a read-only memory (ROM) or a flash memory (flash RAM). The memory may include at least one memory chip.

An embodiment of the present disclosure provides a storage medium on which a program is stored. When the program is executed by a processor, the method applied to a server for controlling a lock may be performed.

An embodiment of the present disclosure provides a processor. The processor may be configured to execute a program. When the program is executed by a processor, the method applied to a server for controlling a lock may be performed.

Further, an embodiment of the present disclosure provides an electronic device including a processor, a memory, and a program stored on the memory and executed by the processor. When the program is executed, the method applied to a server for controlling a lock may be performed.

The method may include obtaining a connection status of the lock, generating an activation code if the connection status is offline, and sending the activation code to a user terminal. The activation code may include an offline password and restriction condition information of the offline password. The lock controller of the lock may obtain the activation code according to the user's input operation and obtain the offline password and the restriction condition information of offline password by resolving the activation code.

Further, if the connection status is online, the method may further include generating an online password and restriction condition information of the online password, sending the online password and the restriction condition information of the online password to the user terminal and the lock controller.

Further, before the operation for obtaining the connection status of the lock is performed, the method may further include obtaining the password type of a password to be applied input by a preset user. If the password type is a clear code, the method may include generating a clear code and restriction condition information of the clear code and sending the clear code and the restriction condition information of the clear code to the user terminal. If the password type is an unlocking password, the method may include performing the operation for obtaining the connection status of the lock.

The devices described in the present disclosure may include a server, a PC, a PAD, a mobile phone, etc.

The present disclosure also provides a computer program product. When executed on a data processing device, the computer program product may be suitable for executing a program including the method applied to a server for controlling a lock. The method may include obtaining a connection status of the lock, generating an activation code if the connection status is offline, and sending the activation code to a user terminal. The activation code may include an offline password and restriction condition information of the offline password. The lock controller of the lock may obtain the activation code according to the user's input operation and obtain the offline password and the restriction condition information of offline password by resolving the activation code.

Further, if the connection status is online, the method may further include generating an online password and restriction condition information of the online password, and sending the online password and the restriction condition information of the online password to the user terminal and the lock controller.

Further, before the operation for obtaining the connection status of the lock is performed, the method may further include obtaining the password type of a password to be applied input by a preset user. If the password type is a clear code, the method may include generating a clear code and restriction condition information of the clear code and sending the clear code and the restriction condition information of the clear code to the user terminal. If the password type is an unlocking password, the method may include performing the operation for obtaining the connection status of the lock.

Optionally, an embodiment of the present disclosure provides a lock controlling device applied to a lock controller. The lock controlling device applied to the lock controller may include a processor and a memory. The status obtaining module, the first generating module, the resolving module, and the first storing module may all be stored in the memory as a program module, and be executed by the processor to perform the corresponding function.

The processor may include one or more kernels. The one or more kernels may be configured to retrieve corresponding program module from the memory. The lock controller may obtain the password issued by the server when the lock is offline by adjusting parameters of the one or more kernels.

The memory may include a non-permanent memory in computer readable media, a random access memory (RAM) and/or a non-volatile memory, such as a read-only memory (ROM) or a flash memory (flash RAM). The memory may include at least one memory chip.

An embodiment of the present disclosure provides a storage medium on which a program is stored. When the program is executed by a processor, the method applied to a server for controlling a lock may be performed.

An embodiment of the present disclosure provides a processor. The processor may be configured to execute a program. When the program is executed by a processor, the method applied to a server for controlling a lock may be performed.

Further, an embodiment of the present disclosure provides an electronic device including a processor, a memory, and a program stored on the memory and executed by the processor. When the program is executed, the method applied to a lock controller for controlling a lock may be performed.

The method may include determining a connection status of the lock, obtaining the inputted activation code including an offline password and restriction condition information of the offline password if the connection status is offline, obtaining the offline password and the restriction condition information of the offline password by resolving the activation code, and storing the offline password and the restriction condition information of the offline password.

Further, if the connection status is online, the method may further include receiving an online password and restriction condition information of the online password issued by the server and storing the online password and the restriction condition information of the online password.

Optionally, the method may further include obtaining a password input by the user, a time point that the user inputs the password, and a total count of historical inputting of the password. If the password is a clear code and the time point meets the restriction condition information of the clear code, the method may include setting all of the valid status of the online password, the valid status of the offline password, and the valid status of the clear code stored in the lock controller to invalid. If the password is an unlocking password, the method may include determining identification information. The unlocking password may include an online password and an offline password. The identification information may indicate whether the time and the count of times that the passwords are allowed to be input by a user meet the restriction condition information of the unlocking password. The method may further include unlocking the lock if the identification information indicates that the time and the count of times that the passwords are allowed to be input by a user meet the restriction condition information of the unlocking password.

The devices described in the present disclosure may include a server, a PC, a PAD, a mobile phone, etc.

The present disclosure also provides a computer program product. When executed on a data processing device, the computer program product may be suitable for executing a program including the method applied to a lock controller for controlling a lock. The method may include determining a connection status of the lock, obtaining the inputted activation code including an offline password and restriction condition information of the offline password if the connection status is offline, obtaining the offline password and the restriction condition information of the offline password by resolving the activation code, and storing the offline password and the restriction condition information of the offline password.

Further, if the connection status is online, the method may further include receiving an online password and restriction condition information of the online password issued by the server and storing the online password and the restriction condition information of the online password.

Optionally, the method may further include obtaining a password input by the user, a time point that the user inputs the password, and a total count of historical inputting of the password. If the password is a clear code and the time point meets the restriction condition information of the clear code, the method may include setting all of the valid status of the online password, the valid status of the offline password, and the valid status of the clear code stored in the lock controller to invalid. If the password is an unlocking password, the method may include determining identification information. The unlocking password may include an online password and an offline password. The identification information may indicate whether the time and the count of times that the passwords are allowed to be input by a user meet the restriction condition information of the unlocking password. The method may further include unlocking the lock if the identification information indicates that the time and the count of times that the passwords are allowed to be input by a user meet the restriction condition information of the unlocking password.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object to be recognized oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local part network (LAN) or a wide part network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. An electric quantity management method for a smart device, including:
    determining a first acquisition value of electric quantity information of the smart device;
    determining a second acquisition value of the electric quantity information of the smart device;
    generating a processing result by processing the first acquisition value and the second acquisition value according to a preset algorithm; and
    determining an electric quantity reporting time of the smart device based on the processing result.

2. The method of claim 1, wherein the method further comprises:
    performing an electric quantity management of the smart device based on the processing result.

3. The method of claim 2, wherein the determining the first acquisition value of the electric quantity information of the smart device includes:
    obtaining a set of electric quantity acquisition values by performing an electric quantity acquisition operation according to a determined electric quantity acquisition time interval, wherein the set of electric quantity acquisition values includes a plurality of electric quantity acquisition values;
    determining a count of the plurality of electric quantity acquisition values in the set of electric quantity acquisition values according to a first preset reporting time;
    calculating an average value of the plurality of electric quantity acquisition values, and recording the average value of the plurality of electric quantity acquisition values as the first electric quantity acquisition value; and recording the first electric quantity acquisition value and a first time point corresponding to the first preset reporting time as the first acquisition value.

4. The method of claim 3, wherein the determining the second acquisition value of the electric quantity information of the smart device includes:

determining a time point corresponding to the first preset reporting time as a time point performing the first time of electric quantity acquisition operation, and acquiring a preset count of electric quantity acquisition values at a preset time interval;

calculating an average of the preset count of the electric quantity acquisition values, and recording the average of the preset count of the electric quantity acquisition values as the second electric quantity acquisition value; and obtaining a second time point when the electric quantity was latest acquired, and recording the second electric quantity acquisition value and the second time point as the second acquisition value.

5. The method of claim 4, wherein the generating the processing result by processing the first acquisition value and the second acquisition value according to the preset algorithm, including:

calculating an electric quantity difference between the first electric quantity acquisition value corresponding to the first acquisition value and the second electric quantity acquisition value corresponding to the second acquisition value; and calculating a time difference between the second time point and the first time point.

6. The method of claim 5, wherein the performing an electric quantity management of the smart device based on the processing result includes:

determining whether the electric quantity difference is greater than a preset abnormal electric quantity change threshold;

in response to determining that the electric quantity difference is greater than the preset abnormal electric quantity change threshold, determining whether the time difference is less than a preset abnormal detection time threshold;

in response to determining that the time difference is less than the preset abnormal detection time threshold, calculating an electric quantity value to be reported according to the first acquisition value and the second acquisition value;

sending the electric quantity value to be reported to a server, and determining whether the smart device is in high-power consumption status based on the electric quantity value to be reported; and performing the electric quantity management operation if the smart device is in the high-power consumption status.

7. The method of claim 3, wherein the determining the second acquisition value of the electric quantity information of the smart device includes:

acquiring electric quantity values within a second preset reporting time range at a preset electric quantity acquisition time interval;

calculating an average value of the electric quantity values within the second preset reporting time range, and recording the average value of the electric quantity values as the second electric quantity acquisition value, wherein the second acquisition value includes the second electric quantity acquisition value and the second time point corresponding to the second preset reporting time.

8. The method of claim 7, wherein the processing result includes a comparison result of the first acquisition value and the second acquisition value; and performing the electric quantity management of the smart device based on the processing result, including:

determining whether the comparison result meets a predetermined condition of a preset normal electric quantity status;

in response to determining that the comparison result meets the predetermined condition of the preset normal electric quantity status, performing a first processing operation of the second acquisition value, wherein the first processing operation indicates that the second acquisition value is not reported to the server; and in response to determining that the comparison result does not meet the predetermined condition of the preset normal electric quantity status, reporting the second acquisition value to the server, and performing a second processing operation of the smart device, wherein the second processing operation indicates the electric quantity management performed on the smart device which is in a low electric quantity status.

9. The method of claim 8, wherein the performing the second processing operation on the smart device includes:

turning off a predetermined power consumption module of the smart device.

10. The method of claim 2, wherein the processing result includes a comparison result of the first acquisition value and the second acquisition value; and performing the electric quantity management of the smart device based on the processing result, including:

determining a current electric quantity status of the smart device based on the comparison result; and reminding user to perform operations related to charging according to the electric quantity status.

11. The method of claim 10, wherein the operations related to charging include at least one of changing batteries, charging, and automatically associating wireless charging devices.

12. The method of claim 10, wherein the reminding the user to perform operations related to charging according to the electric quantity status includes:

in response to determining that the electric quantity of the smart device is less than a preset electric quantity, detecting whether there is a charging device within a preset distance range; and in response to determining that a charging device within the preset distance range is detected, sending a signal output instruction to the charging device, wherein the signal output instruction is used to instruct the charging device to output a target signal for conversion into a current signal.

13. The method of claim 12, wherein the reminding the user to perform charging-related operations according to the electric quantity status further includes:

in response to determining that there is no charging device within the preset distance range, outputting a reminder information, the reminder information is used to remind the user to move the charging device within the preset distance range.

14. The method of claim 1, further comprising:

determining whether there is a terminal device connected to the smart device by a Bluetooth broadcast detection;

in response to determining that a terminal device connected to the smart device, sending the electric quantity value of the smart device to the terminal device at the reporting time.

15. The method of claim 1, wherein the generating the processing result by processing the first acquisition value and the second acquisition value according to the preset algorithm includes:
generating a comparison result by comparing the first acquisition value with the second acquisition value.

16. The method of claim 15, wherein the method further comprises:
reporting the comparison result and confirming whether the reporting is successful,
if the comparison result is reported unsuccessfully, at least storing the comparison result as historical record information.

17. An electric quantity management system for a smart device, including:
a storage device to store instructions; and
one or more processors in communication with the storage device, wherein when executing the instructions, the one or more processors are configured to cause the system to:
determine a first acquisition value of electric quantity information of the smart device;
determine a second acquisition value of the electric quantity information of the smart device;
generate a processing result by processing the first acquisition value and the second acquisition value according to a preset algorithm; and
determine an electric quantity reporting time of the smart device based on the processing result.

18. The system of claim 17, wherein when executing the instructions, the one or more processors are further configured to cause the system to:
perform an electric quantity management of the smart device based on the processing result.

19. An electric quantity management device for a smart device, including:
a first acquisition unit configured to determine a first acquisition value of electric quantity information of the smart device;
a second acquisition unit configured to determine a second acquisition value of the electric quantity information of the smart device;
a comparing unit configured to generate a processing result by processing the first acquisition value and the second acquisition value according to a preset algorithm; and
a determining unit configured to determine an electric quantity reporting time of the smart device based on the processing result.

20. The device of claim 19, wherein the determining unit is further configured to perform an electric quantity management of the smart device based on the processing result.

* * * * *